(12) United States Patent
Greenwood et al.

(10) Patent No.: US 11,091,072 B2
(45) Date of Patent: Aug. 17, 2021

(54) CONDITIONING SYSTEM WITH A B-SIDE DISTRIBUTION SYSTEM

(71) Applicant: GENTHERM INCORPORATED, Northville, MI (US)

(72) Inventors: Shane Kyle Greenwood, Northville, MI (US); Denis Michel Miron, Windsor (CA); Ajay Murgod, Farmington Hills, MI (US)

(73) Assignee: Gentherm Incorporated, Northville, MI (US)

( * ) Notice: Subject to any disclaimer, the term of this patent is extended or adjusted under 35 U.S.C. 154(b) by 0 days.

(21) Appl. No.: 16/763,649

(22) PCT Filed: Nov. 26, 2018

(86) PCT No.: PCT/US2018/062425
§ 371 (c)(1),
(2) Date: May 13, 2020

(87) PCT Pub. No.: WO2019/112823
PCT Pub. Date: Jun. 13, 2019

(65) Prior Publication Data
US 2020/0317096 A1   Oct. 8, 2020

Related U.S. Application Data

(60) Provisional application No. 62/714,291, filed on Aug. 3, 2018, provisional application No. 62/596,080, filed on Dec. 7, 2017.

(51) Int. Cl.
*B60N 2/56*   (2006.01)
*B60N 2/68*   (2006.01)

(52) U.S. Cl.
CPC ............ *B60N 2/5635* (2013.01); *B60N 2/682* (2013.01)

(58) Field of Classification Search
CPC .. B60N 2/5635; B60N 2/5621; B60N 2/5607; B60N 2/682; B60N 2/5628
(Continued)

(56) References Cited

U.S. PATENT DOCUMENTS

| 3,394,887 A | 7/1968 | Megargle et al. |
| 4,923,248 A | 5/1990 | Feher |

(Continued)

FOREIGN PATENT DOCUMENTS

| DE | 202013006135 U1 | 7/2013 |
| KR | 101488179 B1 | 1/2015 |
| WO | 2016/027159 A2 | 2/2016 |

OTHER PUBLICATIONS

International Search Report and Written Opinion for International Application PCT/US2018/062425, dated Mar. 22, 2019.

*Primary Examiner* — Mark R Wendell
(74) *Attorney, Agent, or Firm* — The Dobrusin Law Firm, P.C.

(57) ABSTRACT

A distribution system that includes a plenum. The plenum has a top layer, a bottom layer, an open space formed between the top layer and the bottom layer, and one or more ventilation holes within the top layer. The plenum includes a duct extending from one or more of the one or more ventilation holes that couples the plenum to a cushion hole within a cushion so that the plenum and the cushion are in fluid communication.

26 Claims, 14 Drawing Sheets

(58) Field of Classification Search
USPC .................................................. 297/452.47
See application file for complete search history.

(56) References Cited

U.S. PATENT DOCUMENTS

| | | | |
|---|---|---|---|
| 5,613,729 A | 3/1997 | Summer, Jr. | |
| 5,887,304 A * | 3/1999 | von der Heyde | A47C 21/044 5/423 |
| 5,921,100 A * | 7/1999 | Yoshinori | B60H 1/00285 165/43 |
| 5,924,766 A | 7/1999 | Esaki et al. | |
| 6,059,018 A * | 5/2000 | Yoshinori | B60H 1/00285 165/41 |
| 6,064,037 A | 5/2000 | Weiss et al. | |
| 6,478,369 B1 * | 11/2002 | Aoki | B60H 1/00271 297/180.1 |
| RE38,128 E | 6/2003 | Gallup et al. | |
| 6,629,724 B2 | 10/2003 | Ekern et al. | |
| 6,676,207 B2 | 1/2004 | Rauh et al. | |
| 6,857,697 B2 | 2/2005 | Brennan et al. | |
| 6,869,139 B2 | 3/2005 | Brennan et al. | |
| 6,869,140 B2 | 3/2005 | White et al. | |
| 6,886,350 B2 * | 5/2005 | Petesch | B60H 1/00064 165/42 |
| 6,976,734 B2 | 12/2005 | Stoewe | |
| 7,083,227 B2 | 8/2006 | Brennan et al. | |
| 7,213,876 B2 | 5/2007 | Stoewe | |
| 7,322,643 B2 | 1/2008 | Ishima et al. | |
| 7,338,117 B2 | 3/2008 | Iqbal et al. | |
| 7,356,912 B2 | 4/2008 | Iqbal et al. | |
| 7,475,938 B2 | 1/2009 | Stoewe et al. | |
| 7,506,938 B2 | 3/2009 | Brennan et al. | |
| 7,587,901 B2 | 9/2009 | Petrovski | |
| 7,862,113 B2 * | 1/2011 | Knoll | B60N 2/5657 297/180.14 |
| 8,777,320 B2 * | 7/2014 | Stoll | B60N 2/5635 297/452.42 |
| 10,406,950 B2 * | 9/2019 | Yang | B60H 1/00295 |
| 10,427,567 B2 * | 10/2019 | Line | B60N 2/5642 |
| 2011/0186560 A1 * | 8/2011 | Kennedy | B60N 2/5678 219/217 |
| 2015/0079892 A1 | 3/2015 | Bauer et al. | |
| 2017/0015226 A1 * | 1/2017 | Wolas | B60N 2/5628 |

* cited by examiner

CONDITIONING SYSTEM WITH A B-SIDE DISTRIBUTION SYSTEM

FIELD

The present teachings relate generally a distribution system that connects to a back side (i.e., b-side) of a cushion of a vehicle seat and more particularly a plenum that connects a blower to a cushion, while the plenum assists in distributing fluid within the cushion.

BACKGROUND

For many years, industry has been concerned with designing improved conditioning systems for articles of manufacture such as seats, steering wheels, automotive vehicles, or other transportation vehicles. Examples of such conditioning systems are disclosed in U.S. Pat. Nos. 3,394,887; 5,613,729; 5,924,766; and 7,322,643; all of which are expressly incorporated herein by reference for all purposes. Many systems include a conditioner that is located on a top of a seat with a blower that is located on a bottom of the seat such that air is moved from a remote location to the insert to distribute the air. Some systems include an extended tail that extends from a location on top of the seat to a location behind or under the seat where a blower is located. These systems include a blower that is connected to the seat frame and the tail connects the inset to the blower. Some systems have attempted to connect a blower and insert to a back side of a seat and distribute fluid from the back side of the seat.

What is needed is an air distribution system that connects to a back side of a cushion and seals with the cushion. What is needed is a blower that is connected to a plenum that distributes air along a back side of the cushion. It would be desirable to have a plenum that connects to a seat suspension and suspends a blower from a rear side of a cushion. What is needed is a plenum that includes one or more baffles that distribute fluid within the plenum. It would be desirable to have a plenum include one or more connection features extending between and connecting a top layer to a bottom layer; is free of a spacer layer; or both.

SUMMARY

The present teachings include: a distribution system comprising: (a) one or more plenums each including: (i) a top layer; (ii) a bottom layer; (iii) an open space formed between the top layer and the bottom layer; (iv) one or more ventilation holes within the top layer; and (v) a duct extending from each of the one or more ventilation holes that couples the plenum to a cushion hole within a cushion so that the plenum and the cushion are in fluid communication.

The present teachings include: a method comprising: connecting one or more plenums to a seat suspension so that the seat suspension supports the one or more plenums.

The present teachings provide an air distribution system that connects to a back side of a cushion and seals with the cushion. The present teachings provide a blower that is connected to a plenum that distributes air along a back side of the cushion. It would be desirable to have a plenum that connects to a seat suspension and suspends a blower from a rear side of a cushion. The present teachings provide a plenum that includes one or more baffles that distribute fluid within the plenum. The present teachings provide a plenum including one or more connection features extending between and connecting a top layer to a bottom layer; is free of a spacer layer; or both.

DETAILED DESCRIPTION

Figure 1:
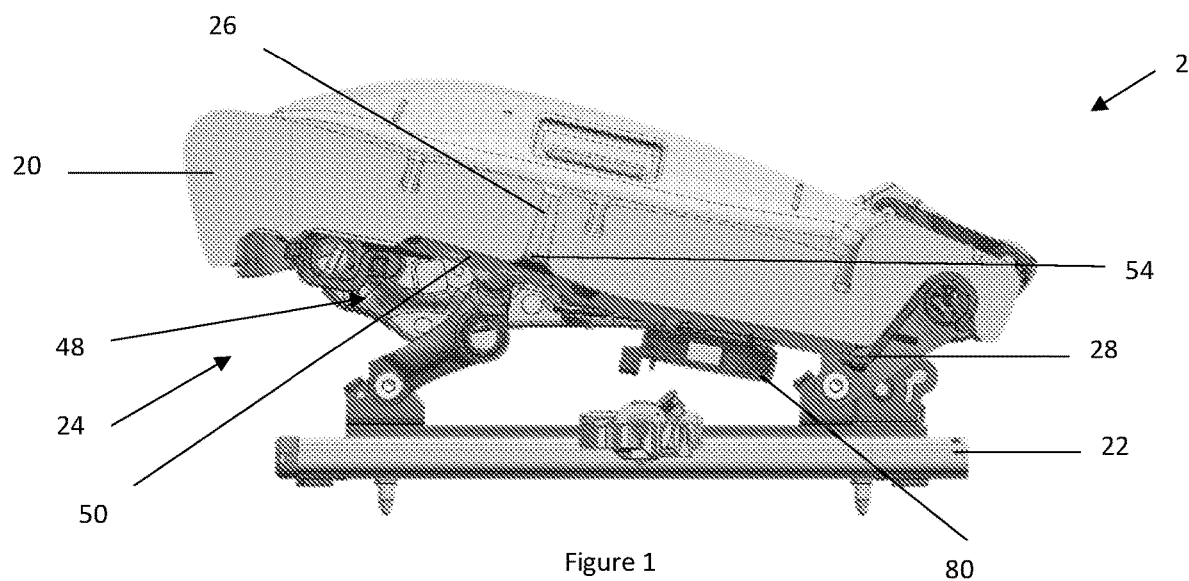
FIG. 1 is a side view of a distribution system connected to a rear side (B-side) of a cushion and supported by the seat suspension.

The explanations and illustrations presented herein are intended to acquaint others skilled in the art with the invention, its principles, and its practical application. Those skilled in the art may adapt and apply the invention in its numerous forms, as may be best suited to the requirements of a particular use. Accordingly, the specific embodiments of the present invention as set forth are not intended as being exhaustive or limiting of the teachings. The scope of the teachings should, therefore, be determined not with reference to the above description, but should instead be determined with reference to the appended claims, along with the full scope of equivalents to which such claims are entitled.

The disclosures of all articles and references, including patent applications and publications, are incorporated by reference for all purposes. Other combinations are also possible as will be gleaned from the following claims, which are also hereby incorporated by reference into this written description.

The present teachings are predicated upon providing an improved conditioning system suitable for integration into a vehicle. For example, the conditioning system may be integrated into or attached to carriers (e.g., members, structures, panels, floors, walls, or the like) of various articles of manufacture such as buildings, furniture, transportation vehicles, (e.g., boats, trains, airplanes, motorcycles, all terrain vehicles, busses, snowmobiles, or otherwise) or the like. Alternatively, the conditioning system may be integrated into or attached to various components of transportation vehicles such as seats, benches, panels, footwells, floor mats, or other components. Preferably, the conditioning system is integrated into a vehicle seat. More preferably, the conditioning system is integrated on a rear side (e.g., B-side of a vehicle seat).

The conditioning system is particularly suitable for integration into a seat of an automotive vehicle. More particularly, the conditioning system is suitable for integration with the seat portion with or without bolsters, back portion with or without bolsters, head rest portion, or a combination thereof. The conditioning system may be located between two layers of the seat. The conditioning system may be located under a fabric layer (e.g. cloth, leather, synthetic leather, or the like) and under a cushion or backrest (e.g. a foam support for the user). In one aspect, the present teachings employ a structure that makes it particularly suited for use beneath a perforated leather seat cover or perforated synthetic leather seat cover. The present conditioning system is particularly attractive for use in combination with a conditioned seat (e.g. a ventilated, actively cooled (such as by use of a thermoelectric device or module), or actively heated seat). The conditioning system may be integrated with the seat foam support by way of moulding, gluing, or other attachment methods. Preferably, the conditioning system includes a distribution system and the distribution system is connected to a seat suspension without use of any adhesives, gluing, or both. More preferably, the conditioning system is included underneath the cushion of the seat and the cushion assists in distributing air from the conditioning system to an occupant, predetermined locations, or both. The seat suspension and the cushion may be directly connected via clips and the plenum may be sandwiched therebetween. The plenum may have no direct attachment to the seat suspension or cushion other than being in contact. The conditioning system may include one or more blowers and one or more inserts (i.e., plenums); one or more heaters, one or more thermoelectric devices, or a combination thereof.

A conditioned seat may include one or more air movers (air movers and blowers are used interchangeably herein). The one or more air movers may move air through one or more inserts that are located within or are located behind the backrest cushion, seat cushion, or both. The one or more plenums may distribute the air from the air mover. The one or more air movers may be an axial fan, a radial fan, or both. Preferably, the one or more air movers are a radial fan. The one or more air movers may include a Thermoelectric Device (TED). The TED may heat air as it enters the air mover or as it leaves the air mover. The TED may cool air as the air enters the air mover or as the air leaves the air mover. The one or more air movers may include a heating device, a cooling device, or both (i.e. a thermoelectric device (TED)). The TED may be used to heat air and/or cool air that is blown onto the user. The air mover and TED may be placed in the seat in many different configurations or in communication with a vehicle seat insert. For example, the TED and/or air mover may be used in any manner or any configuration with an insert described in any of U.S. Pat. Nos. RE38,128; 4,923,248; 6,629,724; 6,676,207; 6,857, 697; 6,869,139; 6,869,140; 6,976,734; 7,083,227; 7,213, 876; 7,338,117; 7,356,912; 7,475,938; 7,506,938; and 7,587, 901 or U.S. Patent Application Publication No. 2009-0218855 the teachings of which are expressly incorporated by reference herein for all purposes. The TED and heater may both produce heat at the same time; however, it is contemplated that the TED or heater may be used separately. The heater may be used to produce heat in an active heating system in place of a TED. The heater, preferably, may not be used when the TED is used to cool the user. The air mover and TED may be used in conjunction with an insert disclosed herein so that air may be directed evenly and consistently to the user. The air may be blown through the insert, a heater, perforations in the seat cover (e.g. trim layer), holes or perforations in a cushion, or a combination thereof. Some examples air permeable seats and heating device are U.S. Pat. Nos. 6,064,037 and 6,869,140 both of which are incorporated by reference herein for all purposes. The TED may blow hot air while the heater contemporaneously heats the seat; thereby, providing both conduction heating and convection heating. The plenum may include cutouts, internal slits, external slits, voids, apertures, carrier configuration, or the like may be shaped similarly or be aligned with the perforations in the seat cover, the cushion, or both.

One or more cushions of the seat may include ventilation, active cooling, active heating, or a combination thereof. The seat may include one or more air movers (i.e. blower) in fluid connection to the one or cushions so that air may be blown onto the user or so that air may be pulled away from the user. The cushion may be connected to or part of a conditioning system, support, a seat suspension, or a combination thereof.

The conditioning system may be used in conjunction with an occupant sensor. An occupant sensor may be used on any seat in conjunction with a conditioning system. Preferably, an occupant senor may only be used on passenger seats. The occupant senor may be any type of occupant senor that senses a passenger in a vehicle seat. The occupant senor may be a membrane sensor, a capacitive sensor, a force sensor, a mass sensor, or a combination thereof. A microprocessor may monitor the occupant senor for a passenger. For example, the microprocessor may be attached to a occupant senor and when the occupant senor measures that the seat is free of an occupant the conditioning system may remain off even if all of the other conditions are met such as the conditioning system being turned on. The occupant sensor may be in contact with a plenum. Preferably, the occupant sensor is located on a top of a cushion and the plenum is located under the cushion. The conditioning system may include one or more distributions systems.

The one or more distribution systems function to guide a fluid towards or away from an occupant contact region. The one or more distribution systems, preferably are located in a bun, a backrest, or both of a vehicle seat. The distribution system may include one or more blowers, one or more plenums, one or more, or both.

The plenum functions to connect to a cushion and assist in transporting fluid through the cushion. Preferably, the plenum functions to connect itself and a blower to a rear side of a cushion. The plenum may be connected to the connection via two way tape. Preferably, the plenum is in contact with but not connected to the cushion. For example, the seat frame or seat suspension may support the plenum and at least a portion of the cushion so that the plenum and cushion are maintained in contact. The plenum may be an insert, a bag, or both. The plenum may include open edges. The plenum may be a two or more pieces connected together. The plenum may be a single piece. The plenum may be created by forming two or more separate pieces or a single piece, cutting openings, and inserting baffles within the plenum. The plenum may be created by forming two or more separate pieces, forming baffles separately, and connecting the baffles to the pieces and connecting the separate pieces together. The plenum may be formed by blow molding, injection molding, thermoforming, extrusion blow molding, vacuum molding, compression molding or a combination thereof. The one or more pieces of the plenum may be connected by welding (e.g., ultrasonic welding, heat sealing, extrusion welding, hot plate welding, etc.), adhesive (e.g., epoxy, glue, etc.), flanges, or a combination thereof. The plenum may be any shape that promotes the flow of air. The plenum may include one or more peripheries. A periphery is an external boundary of a single edge. The peripheral edge may be a continuous peripheral edge (e.g., a circle or oval). The peripheral edge may be made up of two or more edges connected together (e.g., a crescent). The peripheral edge may be made up of three or more edges connected together (e.g., a triangle). The peripheral edge may be made up four or more peripheral edges connected together (e.g., a square, rectangle, or diamond). The peripheral edge may be made of five or more sides (e.g., a pentagon). The peripheral edges may have rotational symmetry. The peripheral edges may not have rotational symmetry. The plenum may have a back side, a front side, and a first side and second side. The width of the back side and front side may be the same or either side may be wider than the other. The back side of the plenum may be closest to the bite line of the seat. The bite line of the seat is where the backrest cushion and leg-rest cushion meet. The back side may be substantially straight, curved, angled, concave, convex, serpentine, rounded, or a combination thereof. The front side of the plenum may be closest to a user's knees or head when located within a seat. The front side may be substantially straight, curved, angled, concave, convex, serpentine, rounded, shaped to the users legs, or any combination thereof. The first side and second side may be substantially straight, curved, angled, concave, convex, serpentine, rounded, or any combination thereof. The first side and second side may be parallel. Preferably, the first side and second side are mirror images of each other. For example, the first side and second side may be concave to promote laminar flow between the blower and the ventilation holes. The plenum may include one or more top layers and one or more bottom layers with one or more insert layers extending between the one or more top layers and the one or more bottom layers. The plenum may include one or more holes in the one or more top layers, one or more bottom layers, or both. The plenum may receive air from an air mover and distribute the air to predetermined locations. The plenum may house an open space. The plenum may resist crushing when an occupant sits in a vehicle seat. For example, the plenum may not completely seal off and air may flow through an entire volume of the plenum. The plenum may have an open space that is self-supporting. The plenum may have an open space that is free of additional material to maintain the openness of the open space. The plenum may include one or more baffles that assist in directing the flow of air to the ventilation holes. The plenum may be made of or include a polymer, plastic, metal, a thermoset, an elastomer, high density polyethylene (HDPE); acrylonitrile butadiene styrene (ABS), or a combination thereof. The plenum, layers of the plenum, baffles of the plenum may be formed from a material that is about 5 mm or less, about 4 mm or less, about 3 mm or less, or about 2 mm or less in thickness. The plenum, layers of the plenum, baffles of the plenum may be formed from a material that is about 0.5 mm or more, about 0.75 mm or more, or preferably about 1 mm or more in thickness (i.e., 1 mm thick film). The plenum may include a plurality of attachment holes for connecting the distribution system to the cushion.

The plenum may include a plurality of attachment holes. The plurality of attachment holes may assist with connecting the plenum with the cushion, seat suspension, or both. The cushion, seat suspension, or both may be connected to the plenum via the attachment holes. The plurality of attachment holes may pierce through the top layer, bottom layer, connection, or a combination thereof. The air may enter the plenum through the bottom layer.

The bottom layer may function to allow air to enter into the plenum and to direct air towards exit locations. The bottom layer may be permeable. Preferably, the bottom layer may be impermeable, include an impermeable coating, or both. The bottom layer may be a porous material. The bottom layer may be a solid. The bottom layer may be made of a polymeric material. The bottom layer and the top layer may be made of the same material. The bottom layer and the top layer may be one co-created piece. The bottom layer and the top layer may be formed separately and then connected together. The bottom layer may be one or more layers. Preferably, the bottom layer is a single layer. The bottom layer may include one or more recesses that are in communication with one or more blowers. The bottom layer may include one or more connection recesses that assist in connecting the blower to the plenum. The bottom layer may include an inlet. The inlet in the bottom layer may be an absence of material where air may move between the blower and the plenum. The inlet may be a flush (e.g., entirely located within a plane of the bottom layer). The inlet may include a venturi or duct that may extend from the bottom layer. The blower may be connected to an inlet (e.g., when the conditioning system is used in push mode). The blower may be connected to an outlet (e.g., when the conditioning system is used in pull mode). Thus, if the conditioning system is changeable between a pull mode and a push mode the blower may be connected to both an inlet and an outlet. As discussed herein the inlet may be both part of the blower connection feature and part of the duct. The venturi or duct may create a connection with the inlet, outlet, or both of the blower. If the inlet is a duct or venture then the shape and configuration may be any of the configurations discussed herein for the duct. The blower and plenum may form a connection without any intervening structures (e.g., gluing, heat staking). The blower may be attached to the one or more blower connection feature.

The blower connection feature may function to create an air seal between the blower and bottom layer. The blower connection feature may use rubber, plastic, fleece, foam, or a combination thereof to form an air seal with the blower. The blower connection feature may include a mating feature to the blower. The mating feature of the blower connection feature may be a twist and lock feature or a press and snap feature. The blower connection feature may have a cross-sectional shape of a cone, cylinder, funnel, square, rectangle, triangle, pyramid, or a combination thereof. The blower connection feature may function to direct air between the blower and the ventilation holes. The bottom layer may be separated from a top layer by an open space.

The open space may function to create an open area between the top layer and the bottom layer. The open space may prevent the bottom layer and the top layer from being moved into contact. The open space may be free of additional material. The open space may resist compression by one or more connection layers extending therethrough. The open may be an absence of material that is located between the top layer and the bottom layer. The open space may include one or more features such as a baffle or a connection layer that extend therethrough.

The one or more baffles may function to distribute air within the open space, distribute air to the ventilation holes, provide uniform distribution of air, or a combination thereof. The one or more baffles may create a path between the one or more ventilation holes and the blower so that fluid passes through each of the ventilation holes and not only the holes closest to the blower. The one or more baffles may be a portion of the top layer, the bottom layer, or both that extend into the open space to create a fluid barrier. The one or more baffles may be added into an open space between layers before the plenum is sealed. The one or more baffles may be curved, substantially straight, teardrop shaped, air plane wing shaped, crescent shaped, serpentine shaped, have a curved portion, have a straight portion, or a combination thereof. The baffles may be rounded on either end. The tear drop baffles have a body that decreases in width from one end to the other end. The baffles that are tear drop shaped may have sides that are substantially straight, concave, convex, curved, or any combination thereof. For example, the teardrop shaped baffle may have substantially straight sides with rounded ends. For example, the teardrop shaped baffle may have a middle body that is less in diameter than either end of the baffle. The one or more baffles may radiate outwards away from the blower attachment feature. The one or more baffles may be located proximate to the blower attachment feature and assist in facilitating air between the blower and the one or more ventilation holes. For example, the baffles may assist the blower in moving equal amounts of air through a ventilation hole that is located within 10 cm of the blower as the blower moves through a ventilation hole that is between 25 cm and 40 cm away. The one or more baffles may assist in directing air from a blower that is not centrally located to ventilation holes that are distal from the blower. For example, a blower may be located in a top quarter of a plenum and the baffles may assist ventilation holes in a bottom quarter to distribute substantially a same volume of air as ventilation holes in the other three quarters of the plenum. For example, if the ventilation holes are not symmetrically spaced apart then the baffles will assist in distributing the air to more equally distribute the air to each ventilation hole (e.g., the volume distribution from ventilation hole to ventilation hole may have a difference of about 50 percent or less, about 40 percent or less, preferably about 30 percent or less, more preferably about 20 percent or less, and most preferably about 10 percent or less). The symmetry of the plenum, location of the ventilation holes, location of the blower, or a combination thereof may be directly proportional to the number of baffles present in the plenum. For example, if a blower is centrally located and the ventilation holes are symmetrically located along one or more two baffles may be needed. If the blower is not centrally located and the ventilations holes are asymmetrically located (relative to a 4-quadrant grid with a center being in a center of the plenum) then 4 or 5 or more plenums may be needed. The one or more baffles may be shaped in a way to assist the flow of air from the blower to the one or more ventilation holes in an even fluid speed. The one or more baffles may have a shape to promote laminar flow. For example, the baffles may be generally straight, linear, free of curved portions, free of concave regions, free of sharp angles, or any combination thereof. A sharp angle may be where the baffle turns at an angle and the angle between two walls of the baffle form an angle of about 120 degrees or less, about 105 degrees or less, about 90 degrees or less, about 65 degrees or less, or about 50 degrees or less. The one or more baffles may be configured to prevent turbulent flow, preventing the open space from closing, or both. For example, the baffles may be straight, linear, free of curved portions, free of concave regions, free of sharp angles, or any combination thereof. A sharp angle may be where the baffle turns at an angle and the angle between two walls of the baffle form an angle of about 120 degrees or less, about 105 degrees or less, about 90 degrees or less, about 65 degrees or less, or about 50 degrees or less. For example, the baffles may increase in cross-sectional width as air moves away from the blower connection feature. For example, the baffles may increase in cross-sectional width as air moves towards to the blower connection feature. The baffles may have a height that is substantially the same height as a distance between a top layer and a bottom layer of the plenum. The baffles may have a height that is less than a distance between the top layer and the bottom layer of the plenum. The baffles may divide the plenum so that more than one blower may be used. The baffles may divide a plenum so that one region may be a push region and one region may be a pull region. The one or more baffles may be a connection layer or may be in addition to a connection layer.

The one or more connection layers may function to support the top layer, the bottom layer, or both so that the open space is not closed off. The one or more connection layers may prevent the open space from collapsing. The one or more connection layers may be an integral part of the top layer, the bottom layer, or both. The connection layer may be added after the top layer, the bottom layer, or both are created. The connection layer may be formed at the same time as the top and bottom layer. The one or more connection layers may extend outwardly from or in a direction generally parallel to the top layer, the bottom layer, or both. The one or more connection layers may be a layer that is located in plane of a vertical wall of the top layer, the bottom wall, or both. The connection layer may be coplanar with a vertical wall of the top layer, the bottom layer, or both. The plenum may be free of a connection layer that forms an outwardly extending flange. The connection layer may be located at the top layer, at the bottom layer, or a location between the top layer and the bottom layer. The connection layer may be added by welding, ultrasonic welding, adhesive, or a combination thereof. Preferably, the connection layer extends between the top layer and the bottom layer.

The top layer may function to distribute air flow to predetermined locations. The top layer may include one or more ventilation holes. The top layer may include a plurality of ventilation holes. The one or more ventilation holes may be aligned with cushion holes in a cushion. The one or more ventilation holes may distribute air from the plenum to locations that correspond with regions of an occupant (e.g., lower back or legs). The one or more ventilation holes may be an absence of material. The one or more ventilation holes may be formed by removing material. The one or more ventilation holes may be formed by cutting the top layer. The top layer and the bottom layer may be connected together around edges to form a seam or connection. The top layer and bottom layer may be ultrasonically bonded together, melted together, glued together, heat staked, friction welded, or a combination thereof. The one top layer, bottom layer, or both may include one or more contours.

The one or more contours may function to shape the plenum to a cushion. The one or more contours may function to shape the plenum so that a rear side of the cushion and the plenum have a mirror shape. The one or more contours may be a bend, an arc, or both. The one or more contours may be located in the top layer and the bottom layer. The one or more contours may be located proximate to or perpendicular to one or more connections (e.g., seals).

The connections may function to create sealed edges so that air can only leave the plenum through predetermined locations. The one or more connections may extend along each edge of the plenum so that a completely sealed plenum is formed. The one or more connections may extend along only longitudinal edges or lateral edges. The connections may be free of any of the insert layer. The connections may extend beyond the insert layer so that the insert layer is entirely located between the top layer and the bottom layer. Preferably, the one or more connections extend around a periphery of the plenum so that all edges of the plenum substantially prevent air leakage. The one or more connections, the plenum, or both may include one or more plenum clips.

The one or more plenum clips function to connect a plenum to a seat suspension, a wire frame, or both. The one or more plenum clips may be integrally formed with the top layer, the bottom layer, or both. The one or more plenum clips may be added to the top layer, the bottom layer, or both after the layers are formed. The plenum clips may be welded on, adhered, over molded, glued, heat staked, or a combination thereof. The one or more plenum clips may have a "J" shape, a "U" shape, or both. The one or more plenum clips may grip the wire frame and the plenum clips may flex to grip the wire frame. The one or more plenum clips may flex to grip the wire frame. The one or more plenum clips may extend from the bottom layer to connect to the wire frame. The one or more plenum clips may assist in aligning one or more ventilation holes with one or more cushion holes.

The one or more ventilation holes may function to align a plenum with a cushion, to connect a plenum to a cushion, or both. The one or more ventilation holes may extend through any portion of the plenum. The one or more ventilation holes may extend through a seam, extra material, an ear along one or more edges of the plenum, or a combination thereof. Preferably, the one or more ventilation holes extend through the top layer of the plenum. The one or more ventilation holes may only be used to align the plenum with the cushion, holes in the cushion, or both. The one or more ventilation holes may be free of connection and may be used for alignment by temporarily being contacted during attachment. Preferably, the one or more ventilation holes assist in connecting the plenum to the cushion. The plenum may be adhesively connected to the cushion. A connection, a seam, or both of a plenum may be adhesively connected to a rear surface of a cushion so that the plenum and the cushion are connected together. Preferably, the plenum is free of an adhesive connection to the cushion. The ventilation holes may extend axially outward from the top layer of the plenum. The one or more ventilation holes may be different diameters relative to another ventilation hole to assist with optimal air flow between the blower and the seat cushion. The one or more ventilation holes may be a plurality of ventilation holes and each of the ventilation holes includes a cross-sectional length and the cross-sectional length of each of the ventilation holes further from the blower have a greater cross-sectional length than the ventilation holes closer to the blower. Preferably, the ventilation hole is an absence of material of a layer of the plenum and the ventilation hole is located in the plane of the layer of the plenum. The ventilation holes may include one or more ducts.

The one or more ducts may function to extend into one or more cushion holes. The one or more ducts may assist in creating a connection with the cushion holes. The one or more ducts may have a cross-sectional length that is greater than a cross-sectional length of the cushion holes. A cross-sectional length of the duct may vary over a height of the duct. The ducts may create a friction fit with the cushion holes. The ducts may have an angle that is "steeper" than an angle of the cushion holes. For example, the ducts may taper along their length so that the duct has a larger cross-sectional thickness at the layer and has a smaller cross-sectional thickness at a location farthest from the layer. The angle of the ducts may be less than an angle of each of the cushion holes. The ducts may be conical, straight, cylindrical, include contours, be free of contours, or a combination thereof. The ducts may have one or more barbs that grip the cushion. The ducts may create a friction fit, a seal, or both with the cushion so that air is transferred between the plenum and the cushion. Some or all of the one or more ducts may be press fit into the one or more cushion holes so that the one or more plenums and the cushion are connected together. The duct may have a cross-section that is cylindrical, conical, parabolic, decreasing in diameter, increasing in diameter, or a combination thereof. The duct may have an opening. The opening of the duct may allow for fluid to enter or exit the duct depending on if the conditioning system is in pull mode or push mode. All of the ducts may have a same size opening. The size of the openings of the ducts may vary from duct to duct. A size of the duct may control an amount of fluid that is moved at each duct. The size of the ducts may vary by about 10 percent or more, about 20 percent or more, or about 30 percent or more by area. The size of the ducts may vary by about 100 percent or less, about 80 percent or less, or about 60 percent or less by area. Fluid flow may be restricted from the duct by a cross-sectional size of the duct and not the inlet. For example, the inlet may be larger than the cross-sectional length of the duct and the narrowest point may control fluid flow out of the duct and not the inlet. The plenum may include one or more connection recesses so that the plenum connects to a blower and the plenum connects to a cushion. The ducts may include one or more bulges or flared tops, which may be used interchangeably herein.

The one or more bulges may function to extend into a cushion and form a fixed connection with the cushion. The one or more bulges may assist a user in moving the duct in a first direction and prevent a user from removing the duct in a second direction. The one or more bulges may lock onto the cushion a first time a user sits on a cushion. The bulges may be arrow shaped, square, rectangular, conical, cylindrical, a cube, or a combination thereof. The bulges may be located at a distal end of a duct (i.e., an end farthest from the plenum). The bulges may increase a cross-sectional thickness of a duct. The bulges may be located on every duct. Only some of the ducts may include bulges. There may be one or more, two or more, three or more, four or more, or even five or more ducts that include bulges. The bulges may be used in lieu of a connection recess or opposite a connection recess.

The one or more connection recesses function to connect to one or more connection features. The one or more connection recesses are a through hole in the plenum that receives a portion of the blower so that the blower connects to the plenum. The plenum may include one or more connection recesses that receive one or more connection features of a blower so that the blower and the plenum are connected together. The connection recesses may function to receive one or more blower clips.

The blower functions to push air, pull air, or both. The blower may be movable with the cushion, the plenum, or both as an occupant sits on the cushion or leaves the cushion. The blower may include an opposite mating feature to the blower connection feature. The blower may be an axial fan. Preferably, the blower may be a radial fan. The blower may include one or more impellers that move air through the blower, the blower housing, the plenum, or a combination thereof. The blower includes an inlet and an outlet. The inlet may be on the bottom side or the top side. Preferably, the inlet is in the bottom side of the blower. The inlet or the outlet is connected to the plenum via the attachment ring, a clip, a blower attachment mechanism, or a combination thereof. The clips of the blower (e.g., blower clips) may connect the blower to a seat suspension and the blower may be connected to the plenum or free of direct connection with the blower. The inlet and outlet may allow air to move into and out of the housing.

The housing functions to connect the blower within a system, direct air to a predetermined location, or both. The housing may connect the blower to a seat, a cushion, a frame, or a combination thereof. The housing may be rigid. The housing may be flexible. The housing may include rigid regions and flexible regions. The housing may include one or more integral parts (e.g., a part that is formed with the housing) that connect the housing, the blower, or both to a cushion, a plenum, or both. The housing may include parts that are added to the housing after the housing is formed and the parts may assist in connecting the housing, the blower, or both to the cushion, a plenum, or both. The housing may include one or more parts (e.g., clips, eyelets, or bands). The housing may be attached to a blower attachment mechanism.

The blower attachment mechanism may function to connect a blower to a plenum. The blower attachment mechanism may permit the blower to be connected to the plenum without the blower being directly connected to the plenum. The blower may be free of a blower attachment mechanism and may directly connect to the plenum via one or more connection features.

The one or more connection features of the blower function to connect a blower directly to the plenum. The one or more connection features may be an integral part of the housing. The one or more connection features and the housing may be formed at the same time so that the one or more connection features and the housing are connected together. The one or more connection features may be discrete from the housing. The one or more connection features may be cantilever and extend from the housing. The one or more connection features may be movable about a pivot point. The one or more connection features may be fixed (i.e., free of movement). The one or more connection features may be hook shaped, "J" shaped, or both. The one or more connection features may have a channel that locks the connection features to a plenum. The one or more connection features may have an open end and a closed end. The open end may receive a support that extends into the connection features and is locked within the closed end of the connection features. The one or more connection features may include a lock that prevents a support from being removed from the connection features.

The one or more cushions may function to support an occupant, a conditioning system, or both. The one or more cushions may extend over a bottom or a back of a frame to form a portion of a vehicle seat. The one or more cushions may be made of an open cell foam, a closed cell foam, or both. The one or more cushions may be located between a trim layer and a frame. The one or more cushions may be located between an occupant and a conditioning system, a plenum, a blower, or a combination thereof. The cushion may include one or more supports, one or more seat suspensions, or both that assist in connecting a plenum, a blower, or both to the cushion.

The one or more supports may function to create an anchor for one or more blowers, one or more plenums, or both. The one or more supports may be formed into the cushion. The one or more supports may be installed in the cushion while the cushion is being formed. The one or more supports may be connected to a vehicle. The one or more supports may assist in supporting a seat suspension.

The one or more seat suspensions may be installed before cushion. The seat suspension may include a wire frame, a plate frame, or both. The seat suspension may support the plenum. The plenum may be located between the seat suspension and the cushion. The blower may be located between the seat suspension and the plenum. The seat suspension may be located between the blower and the plenum. The seat suspension may be located on a rear side of a cushion.

The process may include one or more of the following steps. The plenum may be attached to the cushion. The blower may be connected to the plenum. The plenum, the blower, or both may be connected to the seat suspension. The cushion may be applied over the plenum after the plenum is connected to the blower, the seat suspension, or both.

FIG. 1 illustrates a side view of a conditioning system 2 including a distribution system 48 connected to a cushion 20. The cushion 20 includes a rear side 24 with cushion holes 26 that extend all of the way through the cushion 20. The cushion 20 rests upon a plenum 50 that is attached to a seat suspension 28 of a support 22. The cushion hole 26 and the ventilation hole 54 of the plenum 50 are aligned so that a fluid is moved by the blower 80 between an occupant (not shown) and the blower 80 via the cushion 20 and the plenum 50.

Figure 2:
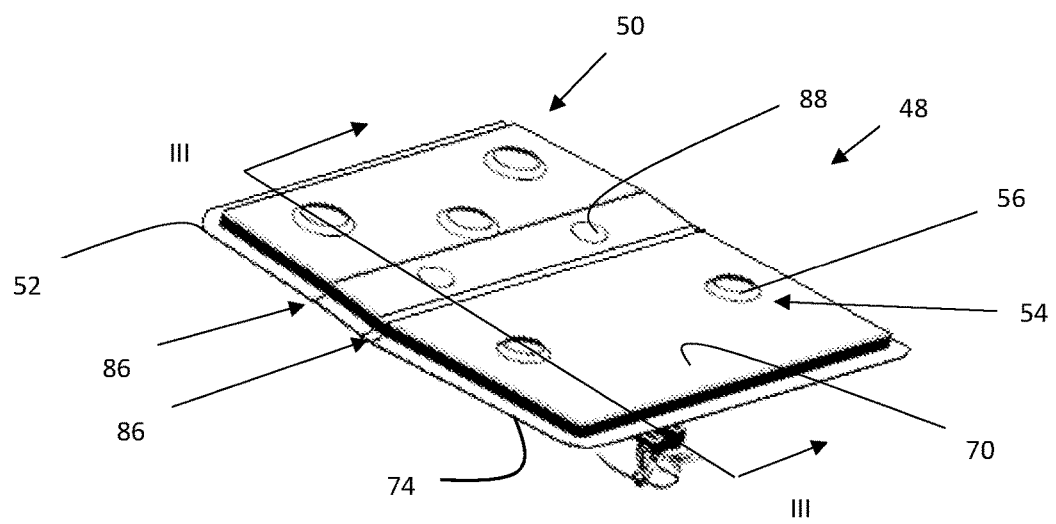
FIG. 2 is a perspective view of a distribution system.

FIG. 2 is a top perspective view of the distribution system 48. The distribution system 48 includes a blower (not shown) connected to the plenum 50. The plenum 50 includes a top layer 70 and a bottom layer 74 with a connection 52 where the top layer 70 and the bottom layer 74 connect together. The top layer 70 includes a plurality of ventilation holes 54 that each include a duct 56. A central region of the plenum 50 includes contours 86 so that the plenum 50 has a shape similar to that of a cushion (not shown). The top layer 70 and bottom layer 74 include connection features 88 that assist in keeping the plenum 50 together and to support an open space (not shown) within the plenum 50.

Figure 3:
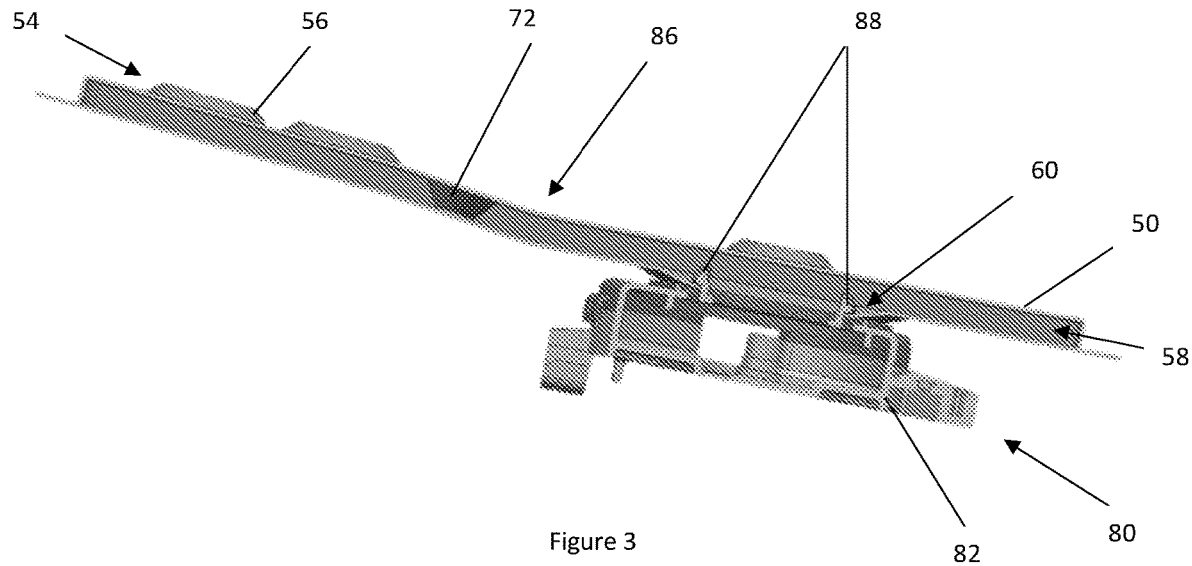
FIG. 3 a cross-sectional view of a plenum and blower of the distribution system of FIG. 2 along lines III-III.

FIG. 3 is a cross-sectional view of the plenum 50 and blower 80 of FIG. 2 along lines III-III. The blower 80 includes a housing 82 with a plurality of connection features 88 that extend into the connection recesses 60 of the plenum 50 so that the plenum 50 and blower 80 are connected together. The plenum 50 includes an open space 58 in communication with the ventilation holes 54. The ventilation holes 54 include a duct 56 that assist in connected the plenum 50 to a cushion (not shown). The plenum 50 includes a contour 86 and a connection layer 72.

Figure 4A:
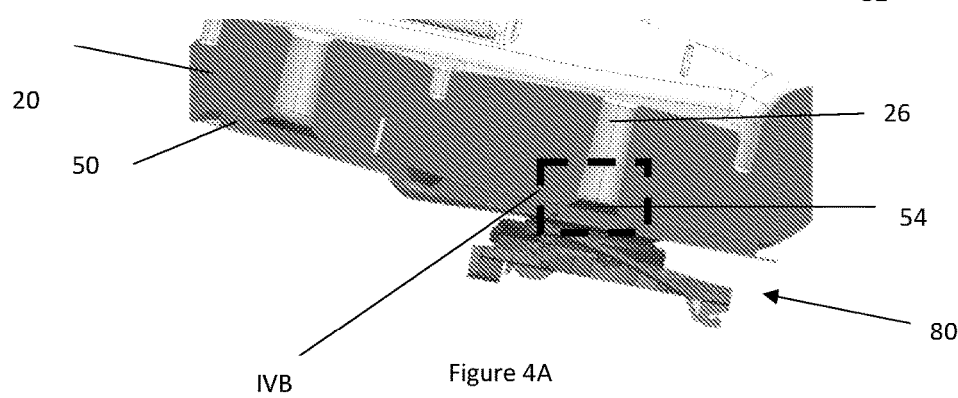
FIG. 4A illustrates a cross-sectional view of the plenum and blower connected to the cushion.

FIG. 4A illustrates a cushion 20 plenum 50 and blower 80 connected together. The plenum 50 includes ventilation holes 54 aligned with the cushion holes 26.

Figure 4B:
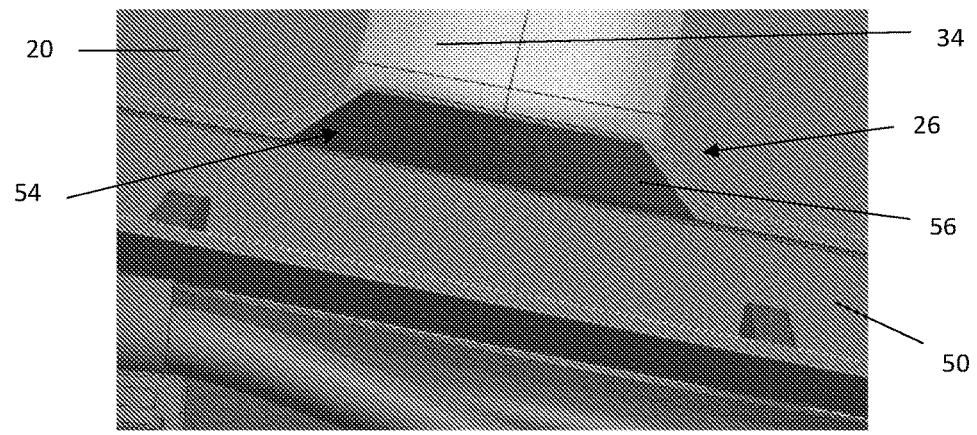
FIG. 4B is a close-up view of an interface between the cushion holes and the ventilation holes of the plenum of FIG. 4A.

FIG. 4B illustrates a cross-sectional view of the connection between the cushion 20 and the plenum 50. The plenum 50 includes a ventilation hole 54 with a duct 56 that extends into the cushion hole 26 to direct fluid into the cushion 20.

Figure 5A:
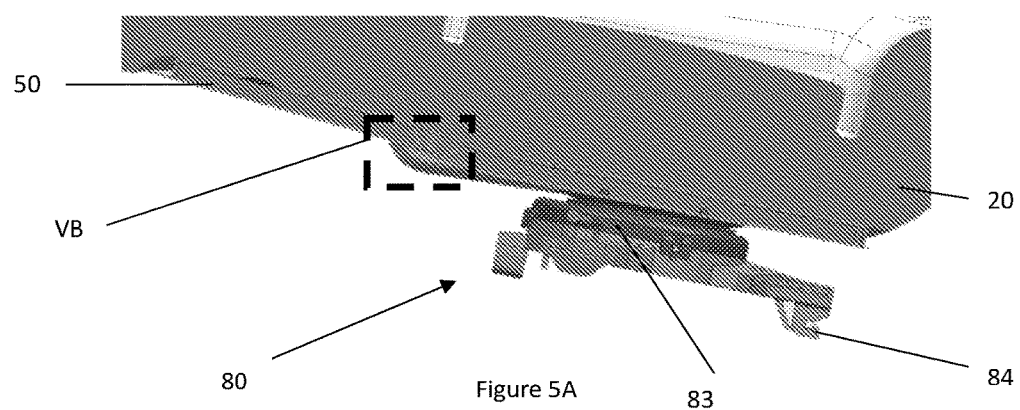
FIG. 5A is a side view of the cushion connected to the air distribution system.

FIG. 5A is a side view of a cushion 20 connected to a plenum 50 and a blower 80 connected to the plenum 50. The blower 80 includes a clip 84 for connecting to a wire frame of a seat suspension (not shown), and a blower attachment mechanism 83 that connects the blower 80 to the plenum 50.

Figure 5B:
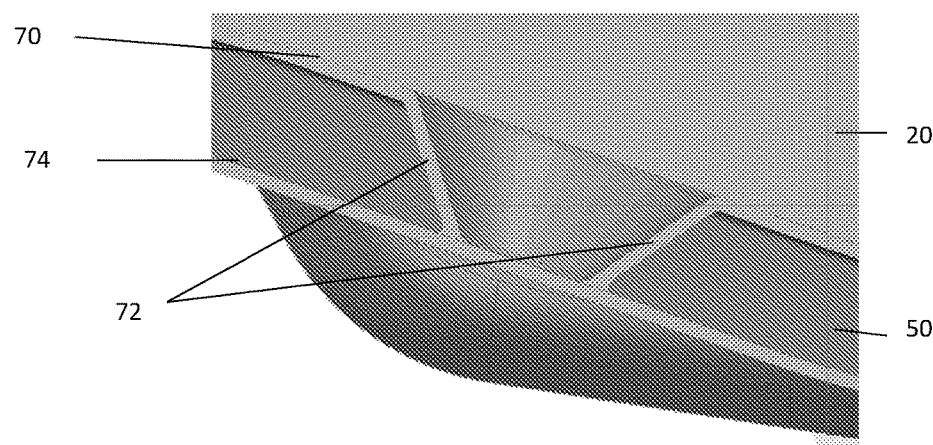
FIG. 5B is a close-up view of the connection layer of the plenum of FIG. 5A.

FIG. 5B is a close-up view of the connection layer 72 of FIG. 5A within box VB. The connection layer 72 extends between and connected the top layer 70 to the bottom layer 74. As shown, the plenum 50 is connected to a cushion 20.

Figure 6:
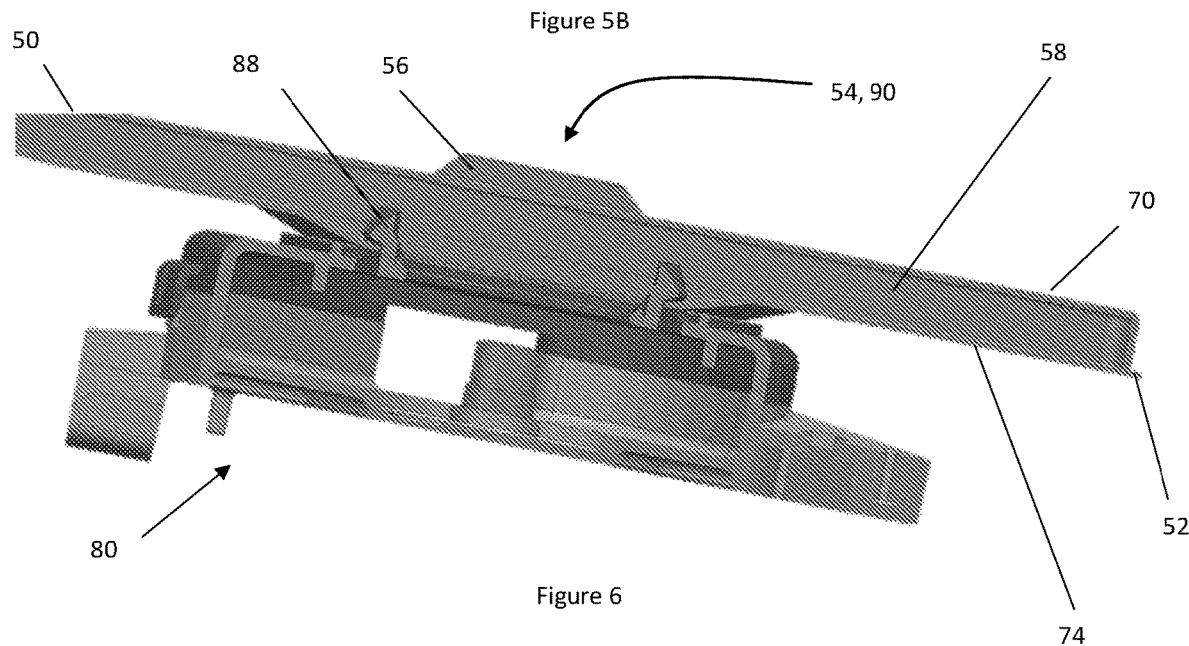
FIG. 6 is a close-up cross-sectional view of a connection between a blower and a plenum.

FIG. 6 is a cross-sectional view of a blower 80 connected to a plenum 50 via a plurality of connection features 88. The plenum 50 includes a top layer 70 and a bottom layer 74 that are joined at a connection 52 so that an open space 58 is formed therein. A ventilation hole 54 also serves as an inlet 90 where air is directed to the blower 30 by the duct 56.

Figure 7:
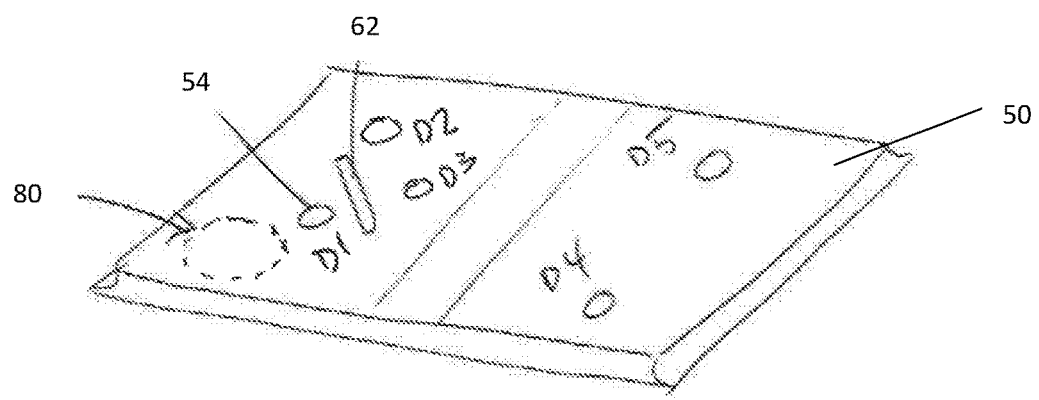
FIG. 7 is a perspective view of a plenum that is transparent so that baffles are visible within the plenum.

FIG. 7 is a perspective view of a plenum 50 including a plurality of ventilation holes 54 located at varying distances from the blower 80. D1, D2, D3, D4, and D5 are ventilation holes 54. The size of the ventilation holes 54 increases as the ventilation holes 54 are located farther from the blower 80 such that D1 is the smaller than D2 and D3 and D4 and D5 are larger than D2 and D3. The plenum 50 also includes baffles 62 that assist in distributing the air so that each of the ventilation holes 54 move a substantially similar amount of fluid.

Figure 8A:
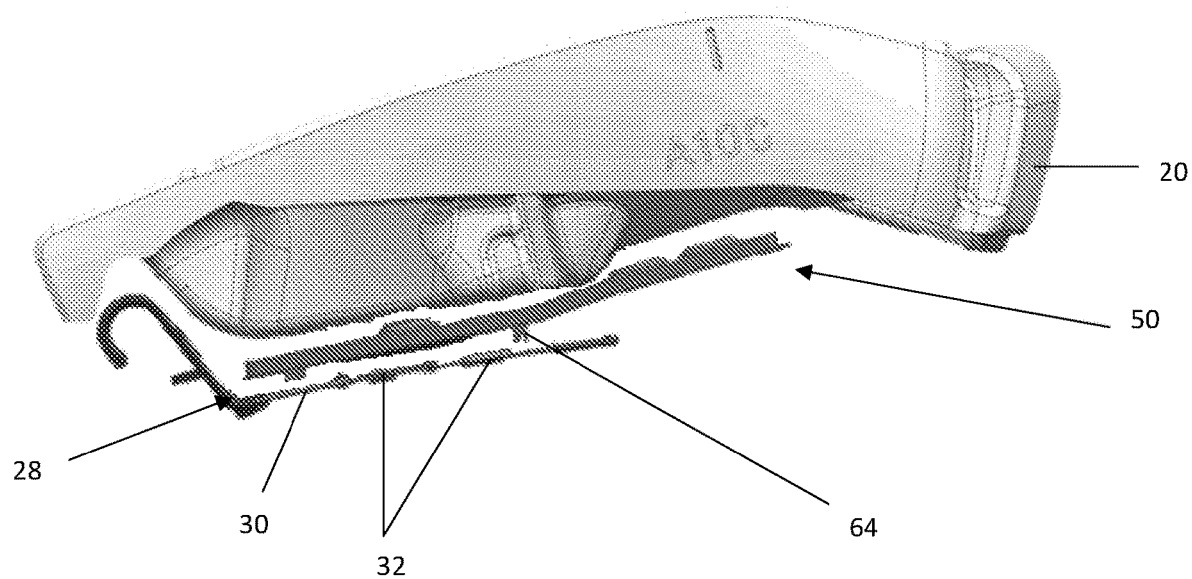
FIG. 8A is a bottom perspective view of a plenum being connected to a cushion by a seat suspension.

FIG. 8A is an exploded view of the cushion 20, plenum 50, and seat suspension 28. The seat suspension 28 includes a wire frame 30 and a plate frame 32. The plenum 50 includes a plurality of plenum clips 64 that connect the plenum 50 to the wire frame 30.

Figure 8B:
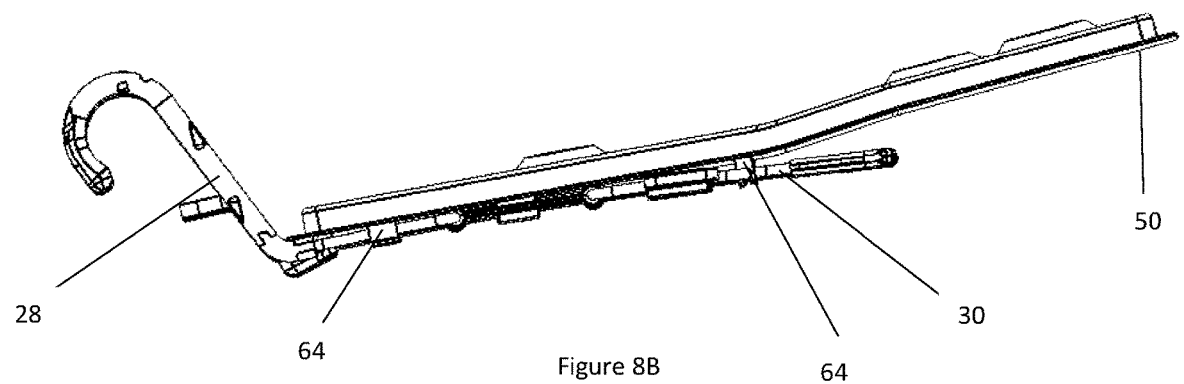
FIG. 8B is a side view of the plenum connected to the seat suspension.

FIG. 8B is a side view of a plenum 50 partially connected to a seat suspension 28. The plenum 50 includes a plurality of plenum clips 64 that each attach to the wire frame 30 to retain the plenum 50 in place.

Figure 8C:
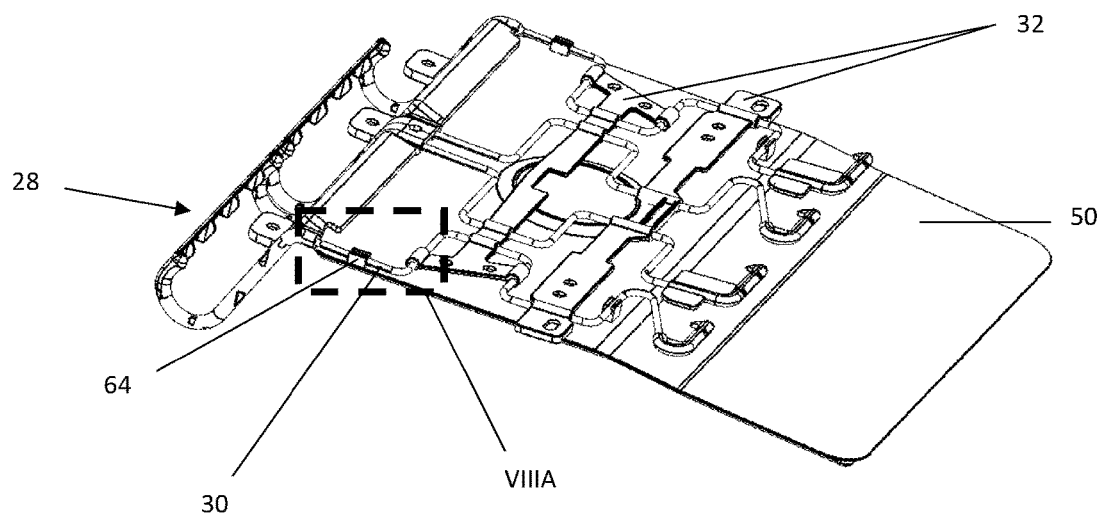
FIG. 8C is a bottom perspective view of the seat suspension and plenum.

FIG. 8C is a bottom view of a plenum 50 connected to the seat suspension 28. The seat suspension 28 includes a wire frame 30 and plate frames 32 and the plenum clips 64 connect to the wire frame 30.

Figure 8D:
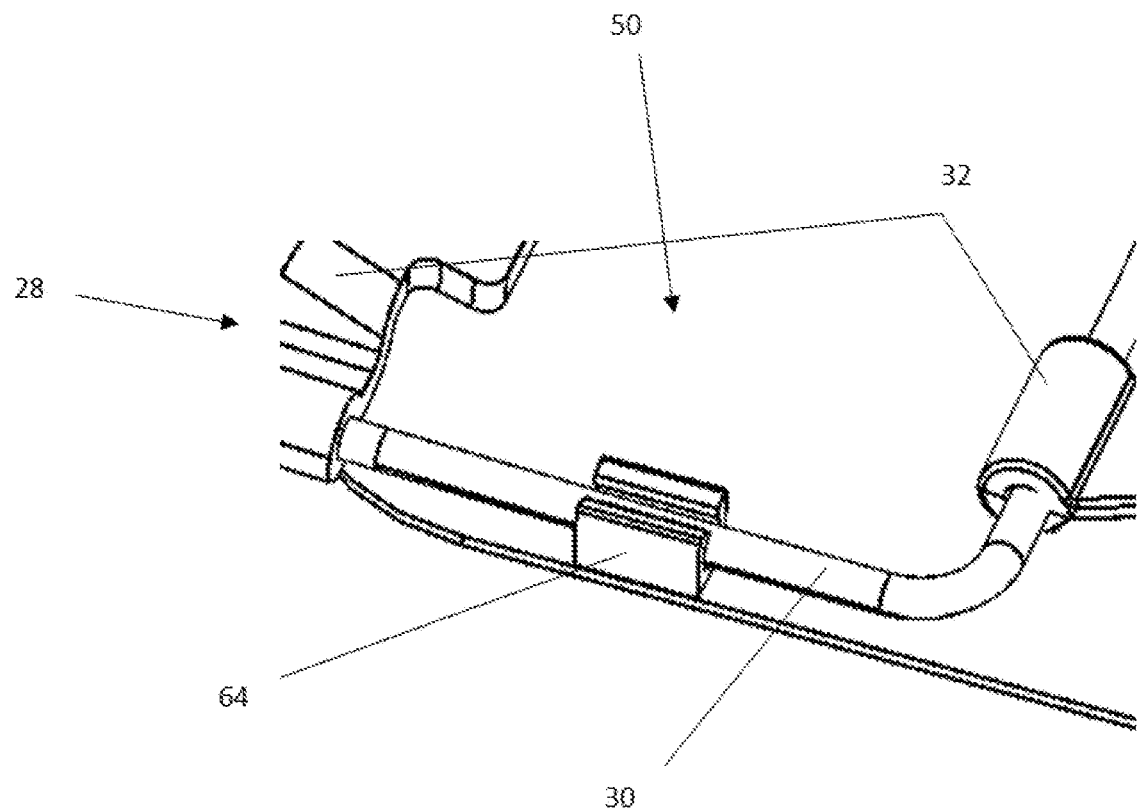
FIG. 8D is a close-up view of a plenum showing attachment of a plenum clip to a suspension frame of FIG. 8C.

FIG. 8D is a close-up view of the plenum 50 and seat suspension 28 in box VIIIA. The seat suspension 28 includes a wire frame 30 and a plate frame 32. The plenum 50 includes a plurality of plenum clips 64 that assist in connecting the plenum 50 and seat suspension 28.

Figure 9:
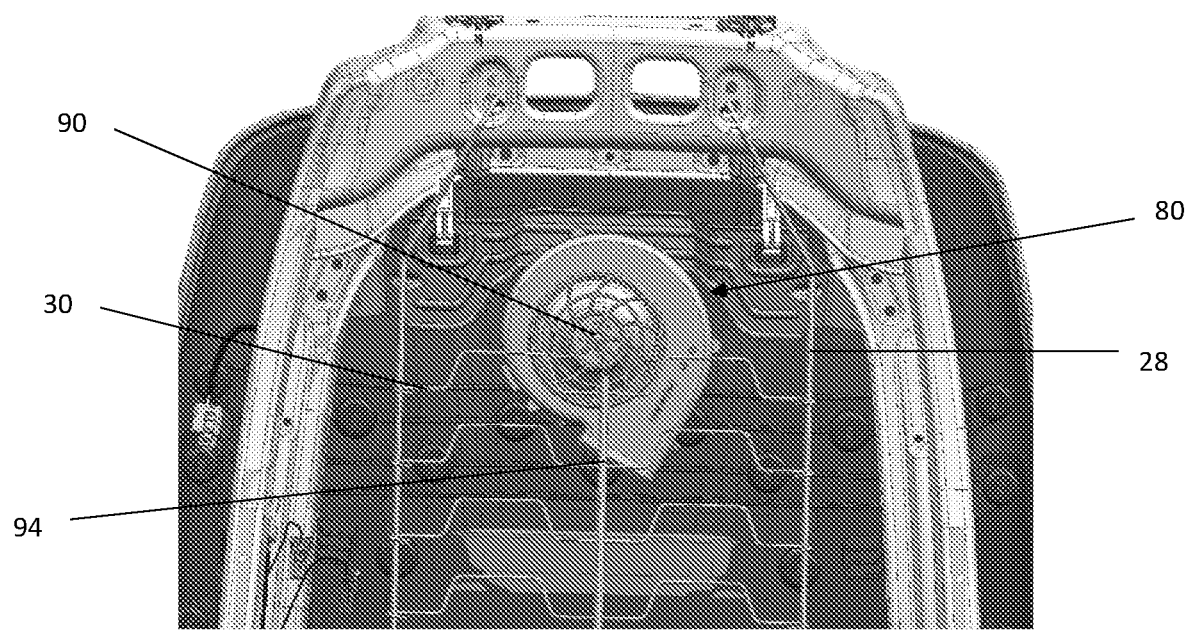
FIG. 9 is a plan view of a rear of a vehicle seat.

FIG. 9 illustrates a blower 80 connected to the seat suspension 28. The blower 80 includes an inlet 90 and an outlet 94. The blower 80 is partially located behind the wire frames 30.

Figure 10:
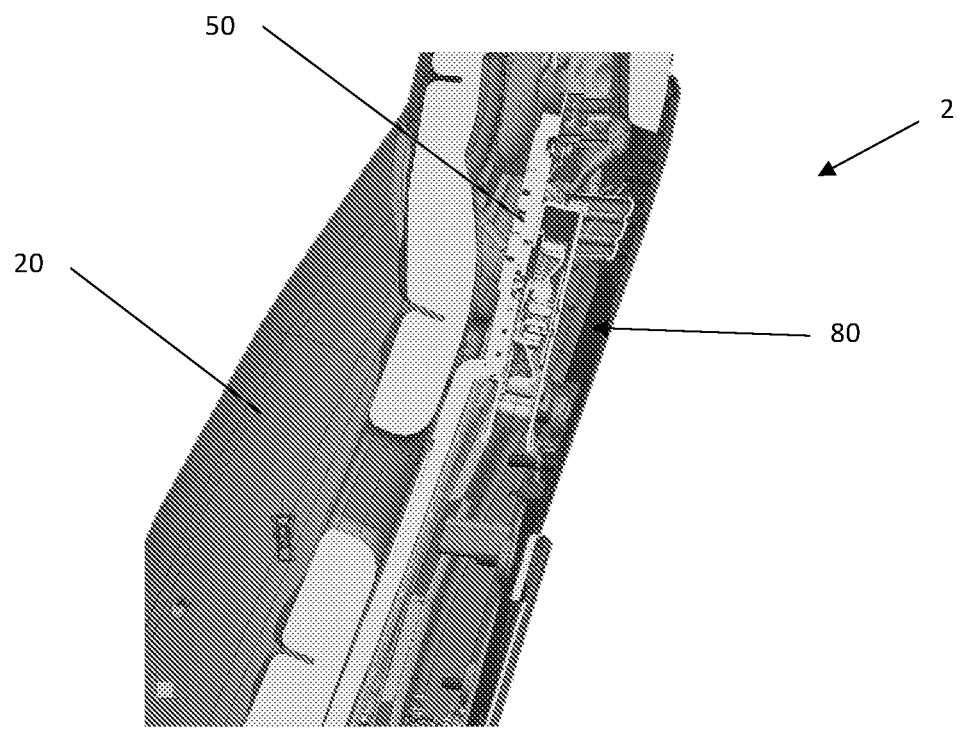
FIG. 10 is a cross-sectional view of a distribution system connected to a back cushion.

FIG. 10 is a partial cross-sectional view of a conditioning system 2. The conditioning system 2 includes a blower 80, a plenum 50 and a cushion 20 that are connected together.

Figure 11A:
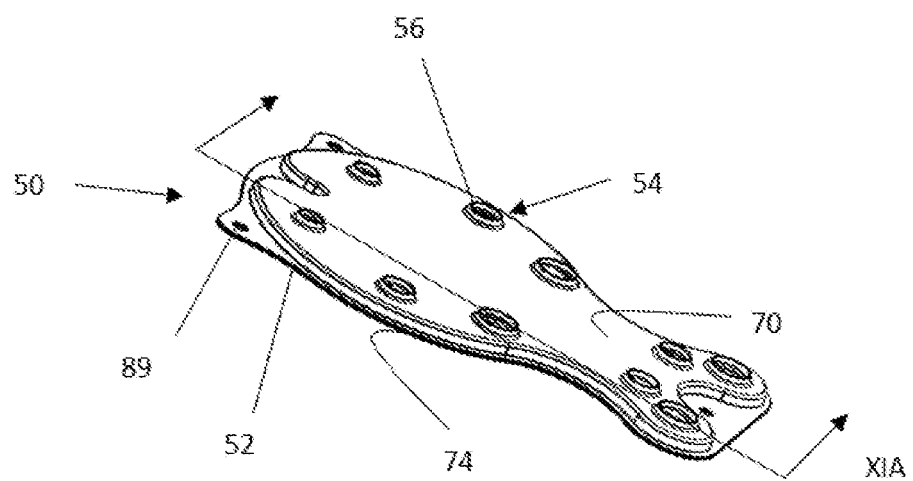
FIG. 11A is a perspective view of a plenum.

FIG. 11A is perspective view of a plenum 50. The plenum 50 includes a top layer 70 and a bottom layer 74 with a connection 52 where the top layer 70 and the bottom layer 74 connect together. The top layer 70 includes a plurality of ventilation holes 54 that each includes a duct 56. The plenum 50 includes a plurality of attachment holes 89 piercing through the top layer 70, connection 52, and bottom layer 74 that assist in connecting the plenum 50 to a cushion (not shown).

Figure 11B:
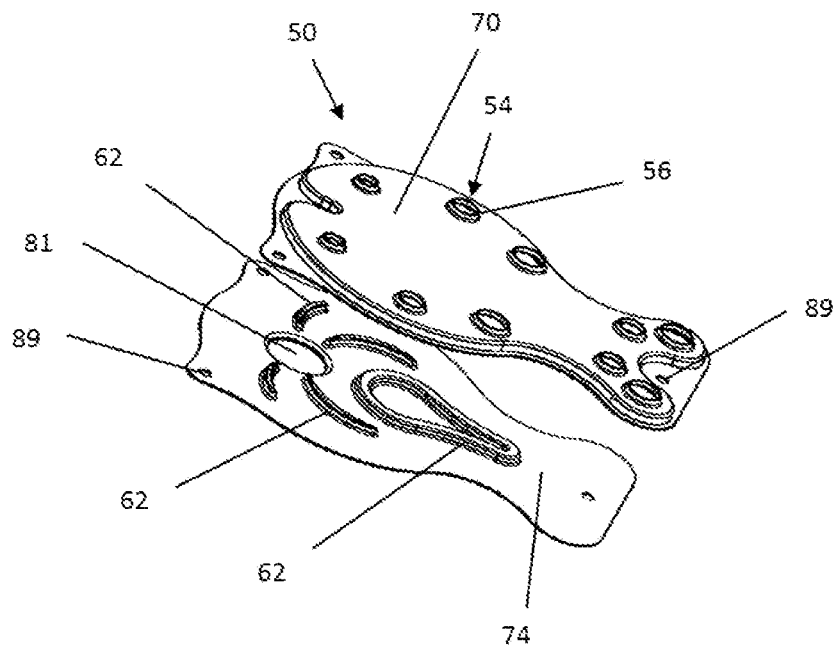
FIG. 11B is an exploded view of a plenum.

FIG. 11B is an exploded view of a plenum 50. The plenum 50 includes a top layer 70 and a bottom layer 74. The plenum includes a plurality of attachment holes 89 that assist in connecting with the cushion (not shown), seat suspension (not shown), or both. The top layer 70 includes a plurality of ventilation holes 54 that each includes a duct 56. The bottom layer 74 includes a blower connection feature 81 in a substantially central region of the bottom layer 74 that links to a blower (not shown). The bottom layer 74 includes a plurality of baffles 62 positioned proximate to the blower connection feature 81.

Figure 11C:
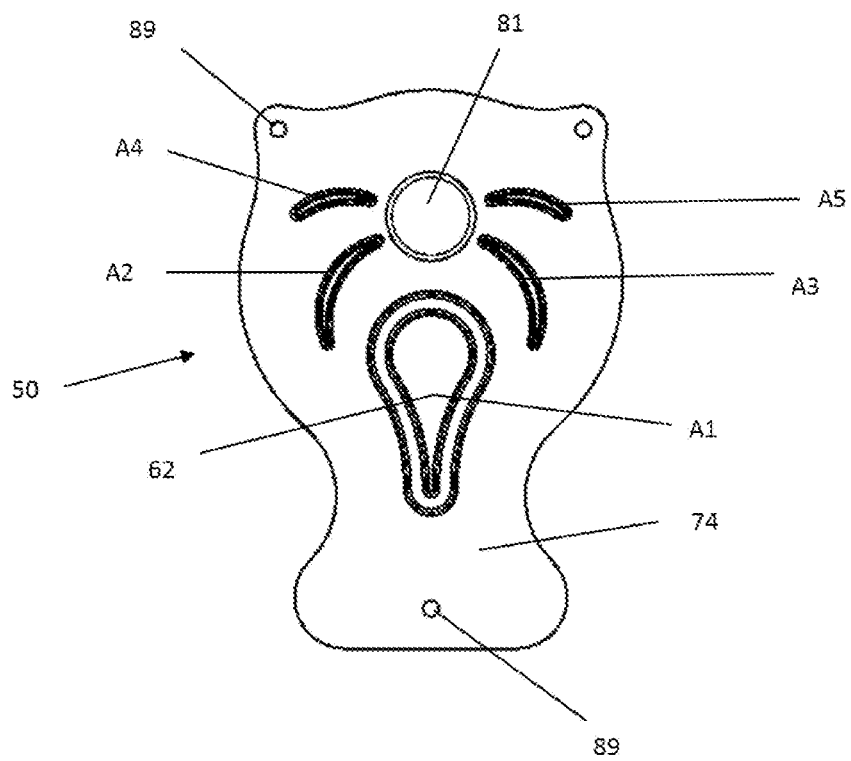
FIG. 11C is a top view of a bottom layer.

FIG. 11C is a top view of the bottom layer 74 of a plenum 50. The bottom layer 74 includes a plurality of attachment holes 89. The bottom layer 74 includes a blower connection feature 81. The bottom layer 74 includes a plurality of baffles 62, and A1, A2, A3, A4, and A5 are baffles 62. The plurality of baffles 62 are positioned around blower connection feature 81. The plurality of baffles 62 are such that all of the baffles 62 are rounded at any edge. Baffle A1 is substantially in the center of the bottom layer 74. Baffle A1 is teardrop shaped such that baffle A1 is narrow closest to the blower connection feature 81; increases to its largest width; and then decreases in width in a concave fashion to a rounded edge at the farthest point from the blower connection feature 81. Baffles A2 and A3 are located between baffle A1 and baffles A4 and A5. Baffles A2 and A3 are crescent shaped. Baffles A2 and A3 curve downward from the blower connection feature 81 toward baffle A1. Baffles A4 and A5 are proximate to the blower connection feature 81 and baffles A2 and A3. Baffles A4 and A5 are substantially perpendicular to baffle A1. Baffles A4 and A5 are crescent shaped and curve slightly toward baffles A1, A2, and A3.

Figure 11D:
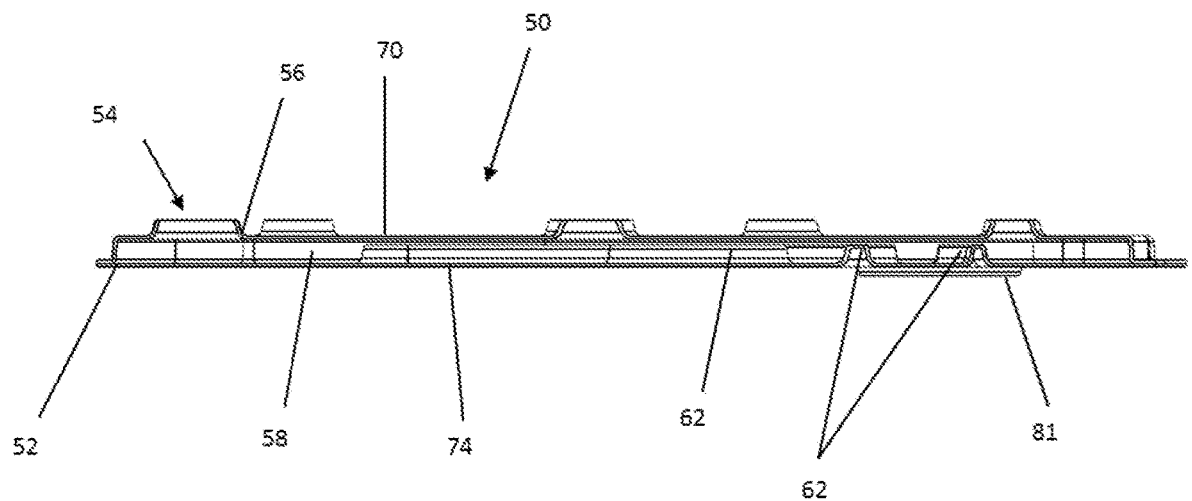
FIG. 11D is a cross-sectional view of a plenum.

FIG. 11D is a cross-sectional view of a plenum 50 along line XIA in FIG. 11A. The plenum 50 includes a top layer 70 and a bottom layer 74 with a connection 52 where the top layer 70 and the bottom layer 74 connect together. The top layer 70 includes a plurality of ventilation holes 54 that each includes a duct 56. The duct 56 decreases in diameter as the duct 56 extends outwardly from the plenum 50. The duct 56 is connected to the cushion (not shown) to create a fluid connection. The plurality of baffles 62 on the bottom layer 74 are connected to the top layer 70. The plurality of baffles 62 assist in keeping an open space 58 between the top layer 70 and bottom layer 74. The bottom layer 74 includes a blower connection feature 81 that tapers outwardly from the plenum 50.

Figure 12A:
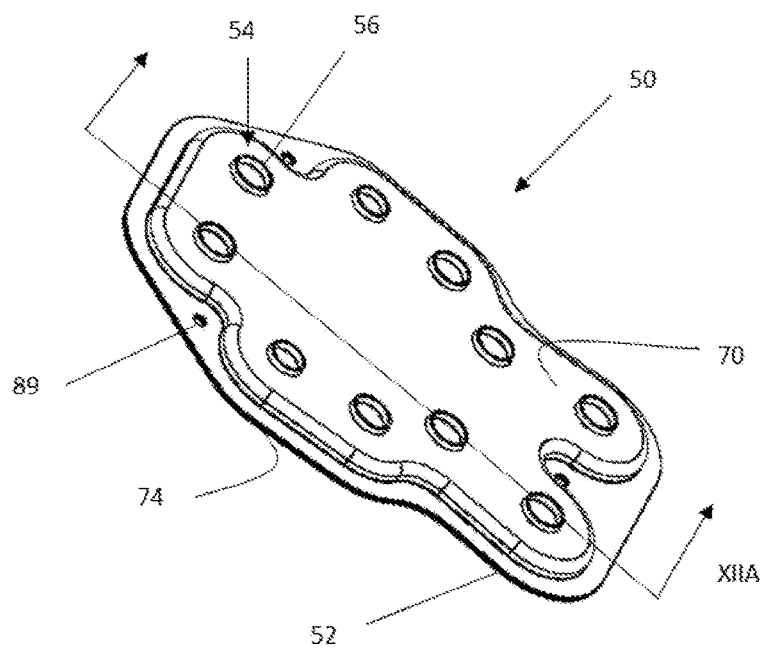
FIG. 12A is a perspective view of a plenum.

FIG. 12A is a perspective view of a plenum 50. The plenum 50 includes a top layer 70 and a bottom layer 74 with a connection 52 where the top layer 70 and the bottom layer 74 connect together. The top layer 70 includes a plurality of ventilation holes 54 that each includes a duct 56 with a cylindrical shape. The plenum 50 includes a plurality of attachment holes 89 piercing through the top layer 70 and bottom layer 74 that assist in connection with the cushion (not shown).

Figure 12B:
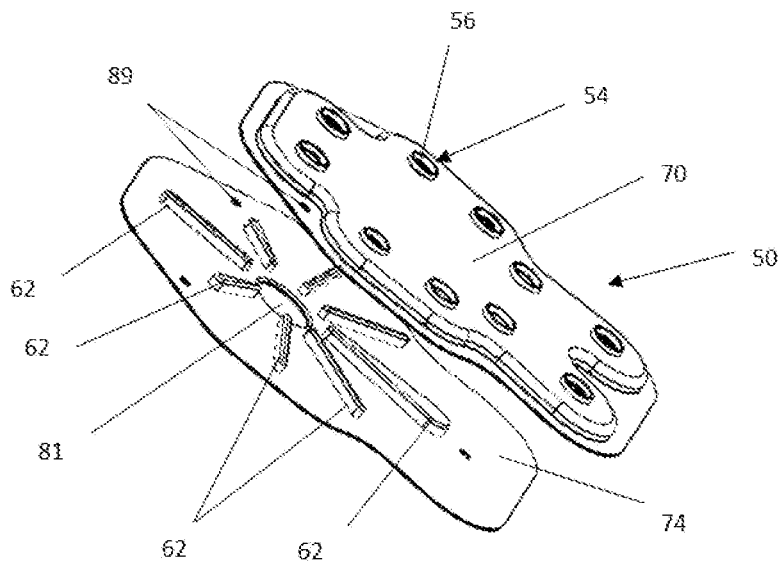
FIG. 12B is an exploded view of a plenum.

FIG. 12B is an exploded view of a plenum 50. The plenum 50 includes a top layer 70 and a bottom layer 74. The top layer 70 includes a plurality of ventilation holes 54 that each includes a duct 56. The duct 56 remains substantially the same diameter as the duct 56 extends outwardly from the plenum 50. The duct 56 extends into the cushion (not shown) to force a fluid to communicate between the cushion and plenum. The top layer 70 and bottom layer 74 each include a plurality of attachment holes 89. The bottom layer 74 includes a blower connection feature 81 in the central region of the bottom layer 74 that connects to a blower (not shown). The bottom layer 74 includes a plurality of baffles 62 radiate around the blower connection feature 81. The baffles 62 assist to facilitate air between the plurality of the ventilation holes 54 and the blower (not shown).

Figure 12C:
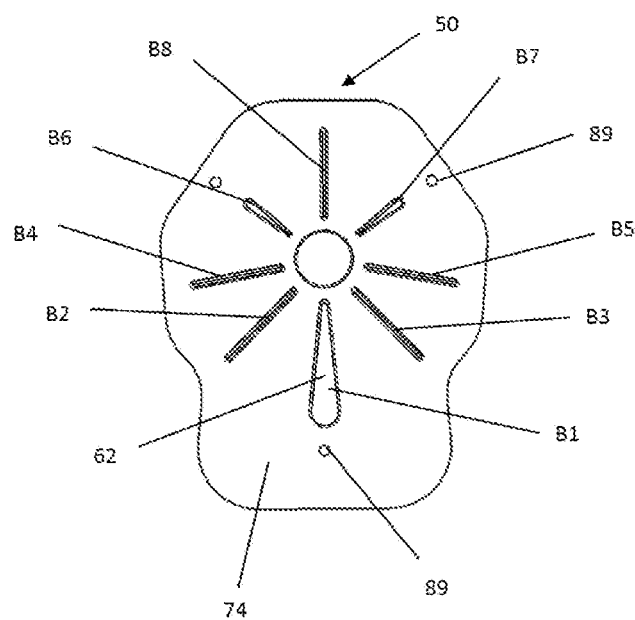
FIG. 12C is a top view of a bottom layer.

FIG. 12C is a top view of a bottom layer 74 of a plenum 50. The bottom layer 74 includes a plurality of attachment holes 89 that pierce through the bottom layer 74. The bottom layer 74 includes a plurality of baffles 62 where B1, B2, B3, B4, B5, B6, B7, and B8 are baffles 62 that radiate around the blower connection feature 81. Baffles B1, B6, and B7 are tear drop shaped such that the narrowest diameter of the baffle 62 is nearest to the blower connection feature 81. Baffles B1, B6, and B7 increase in diameter with a substantially straight periphery as B1, B6, and B7 radiate away from the blower connection feature 81 until each tapers off to a rounded edge that is closest to the attachment holes 89. Baffles B2, B3, B4, B5, and B8 are rounded on both ends. Baffles B2, B3, B4, B5, and B8 radiate away from the blower connection feature 81 in a substantially straight direction and even diameter.

Figure 12D:
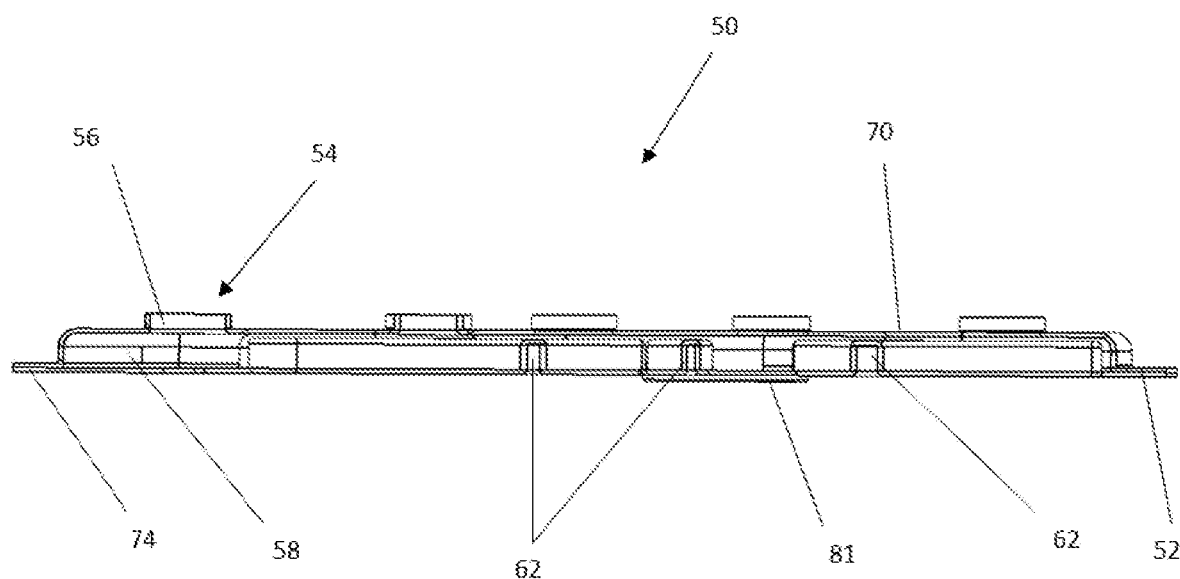
FIG. 12D is a cross-sectional view of a plenum.

FIG. 12D is a cross sectional view of a plenum 50 along line XIIA in FIG. 12A. The plenum 50 includes a top layer 70 and a bottom layer 74 with a connection 52 where the top layer 70 and the bottom layer 74 connect together. The top layer 70 includes a plurality of ventilation holes 54 that each includes a duct 56 that is the cross-sectional shape of a cylinder. The diameter of the duct 56 remains substantially the same as the duct 56 extends outwardly from the plenum 50 at a 90 degree angle. The top layer 70 and bottom layer 74 have an open space 58 therebetween to allow air to move between the blower (not shown) and the ventilation holes 54. The bottom layer 74 includes a plurality of baffles 62 that direct air between the blower (not shown) and the ventilation holes 54. The bottom layer 74 includes a blower connection feature 81 that assists with creating a fluid connection with the blower (not shown) and the plenum 50.

Figure 13A:
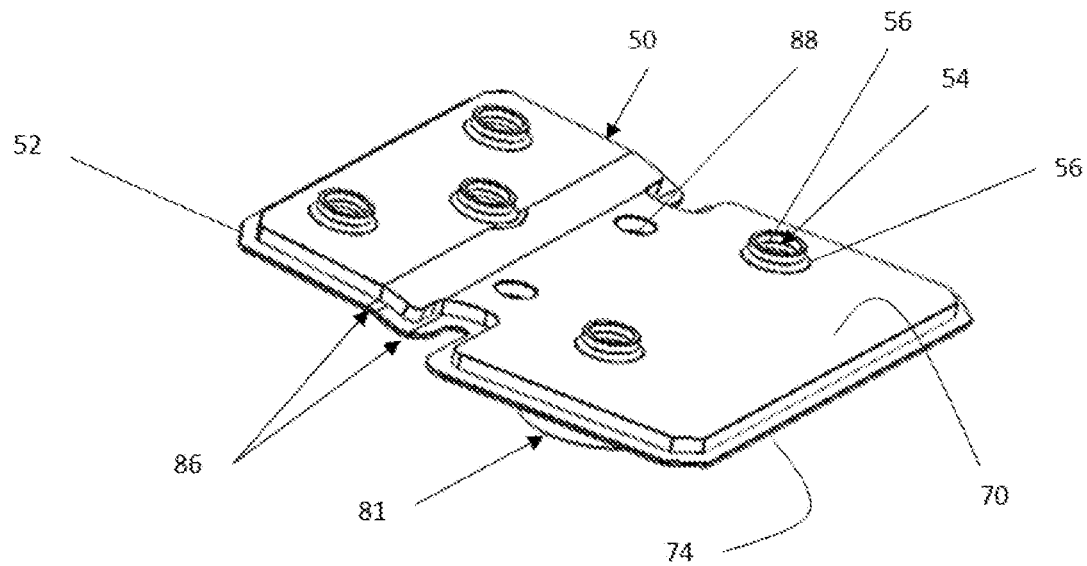
FIG. 13A is a perspective view of a plenum.

FIG. 13A is a perspective view of a plenum 50. The plenum 50 includes a top layer 70 and a bottom layer 74 with a connection 52 where the top layer 70 and the bottom layer 74 connect together. The top layer 70 includes a plurality of ventilation holes 54 that each includes a duct 56 that is funnel shaped sandwiched between a top layer 70 and a duct 56. The top layer 70 and bottom layer 74 include connection features 88. The connection features 88 assist with keeping the plenum 50 from collapsing and to support an open space (not shown). The plenum 50 includes a contour 86 that assists connection among the plenum 50, seat suspension (not shown), and cushion (not shown), or a combination thereof. The bottom layer 74 includes a blower connection feature 81 that assists connection between the plenum 50 and the blower (not shown).

Figure 13B:
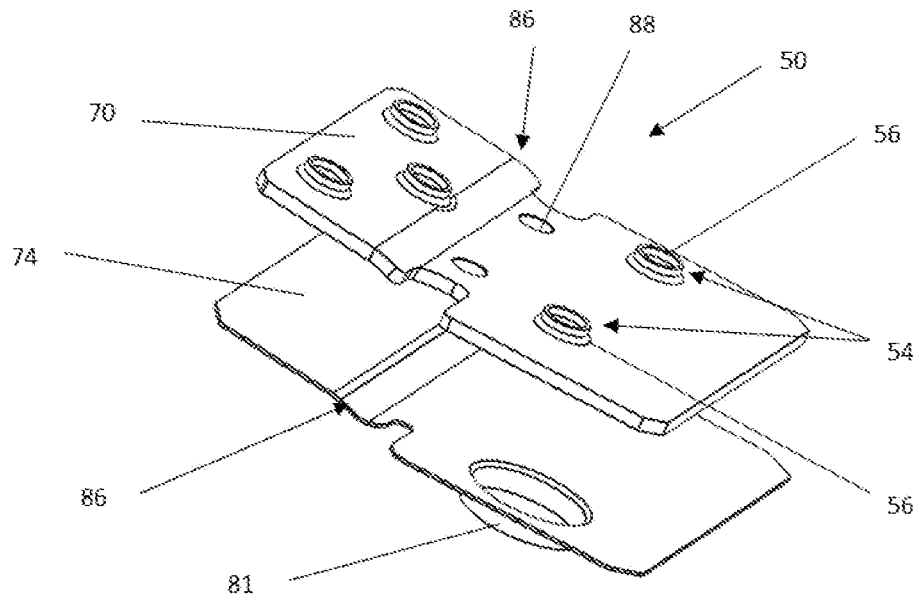
FIG. 13B is an exploded view of a plenum.

FIG. 13B is an exploded view of a plenum 50. The plenum 50 includes a top layer 70 and a bottom layer 74. The top layer 70 includes a plurality of ventilation holes 54 that each include a duct 56. The bottom layer 74 includes a blower connection feature 81 that assists connection between the plenum 50 and blower (not shown). The plenum 50 includes a contour 86 that assists with attaching the plenum 50 around the seat cushion (not shown). The plenum 50 includes connection features 88 that separate the top layer 70 and bottom layer 74. The connection features 88 separate the top layer 70 and bottom layer 74 to form the open space (not shown).

Figure 13C:
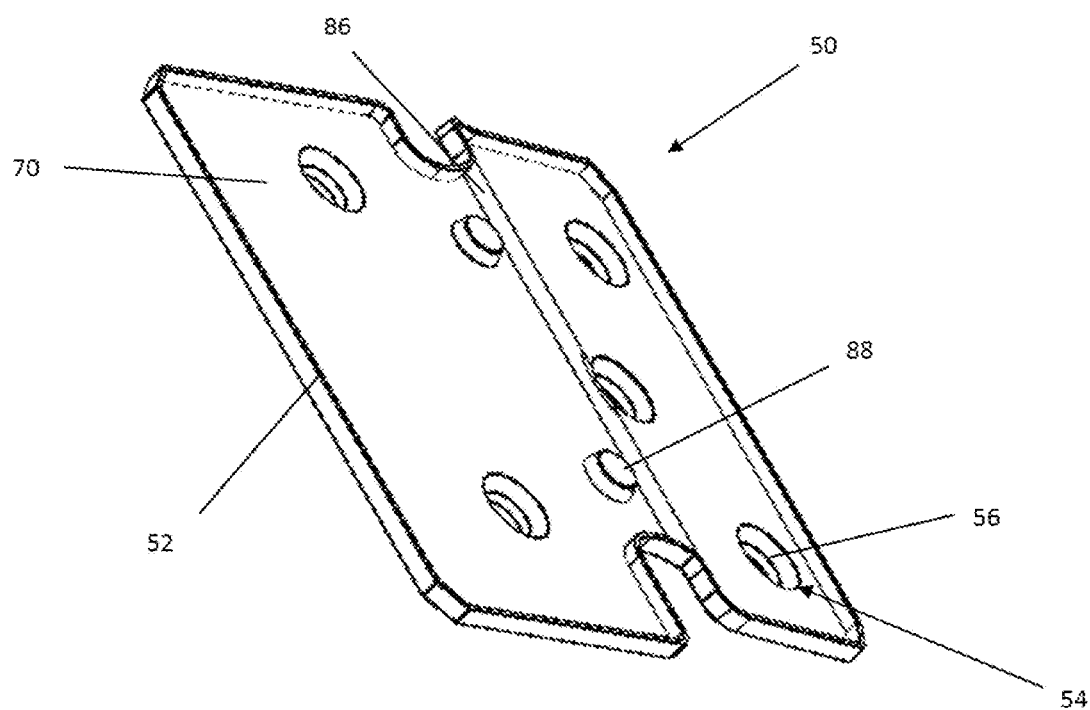
FIG. 13C is a bottom view of a top layer.

FIG. 13C is a bottom view of a top layer 70 of a plenum 50. The top layer includes a plurality of ventilation holes 54 that have ducts 56. The ducts 56 extend away from the top layer 70 and bottom layer (not shown). The top layer 70 includes a connection 52 that is the location where the top layer 70 and bottom layer (not shown) meet. The top layer 70 includes a contour 86 that assists connection with the cushion (not shown) by bending to form a tight fit between the plenum 50 and cushion (not shown). The connection features 88 are used to separate the top layer 70 and bottom layer (not shown) when pressure is applied to the cushion (not shown). The connection features 88 extend away from the top layer 70 towards the bottom layer (not shown) at a right angle. The connection features 88 have a cross-sectional shape of a funnel.

Figure 13D:
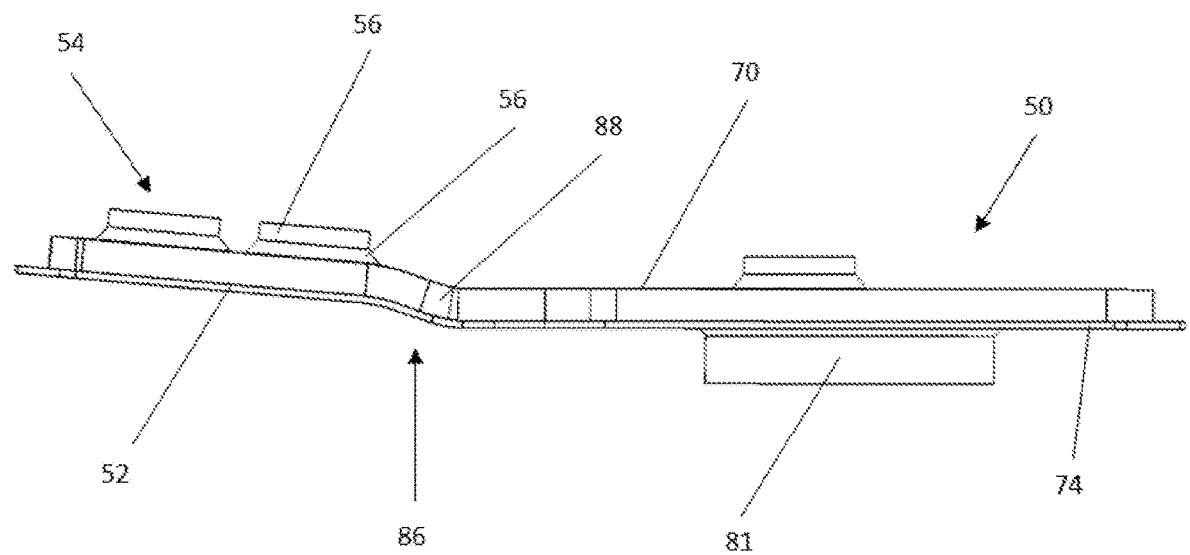
FIG. 13D is a side view of a plenum.

FIG. 13D is a side view of a plenum 50. The plenum includes a contour 86 and a connection feature 88. The contour 86 allows the plenum 50 to bend and form a tight fit around the cushion (not shown). The connection feature 88 keeps the top layer 70 and bottom layer 74 separate as the contour 86 bends the plenum 50. The plenum includes a top layer 70 and bottom layer 74 that are connected by a connection 52. The top layer 70 includes a plurality of ventilation holes 54 each with a duct 56. The duct 56 decreases in diameter and tapers off to a cross-sectional cylinder as the duct 56 extends away from the top layer 70. The bottom layer 74 includes a blower connection feature 81 that extends substantially straight outwardly from the plenum 50.

Figure 14A:
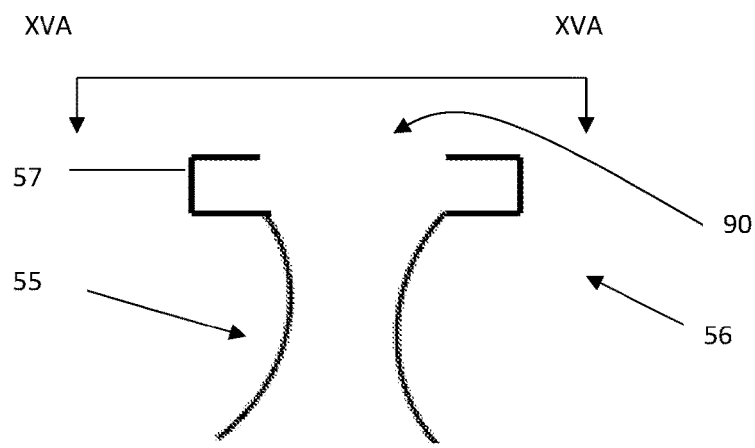
FIG. 14A is a cross-sectional view of a duct including a bulge.

FIG. 14A is a cross-sectional view of a duct 56. The duct 56 includes a venturi 55 with a bulge 57 at a top of the duct 56. The duct 56 includes an opening 90 that has a cross-sectional length that is greater than a cross sectional length of the venturi 55.

Figure 14B:
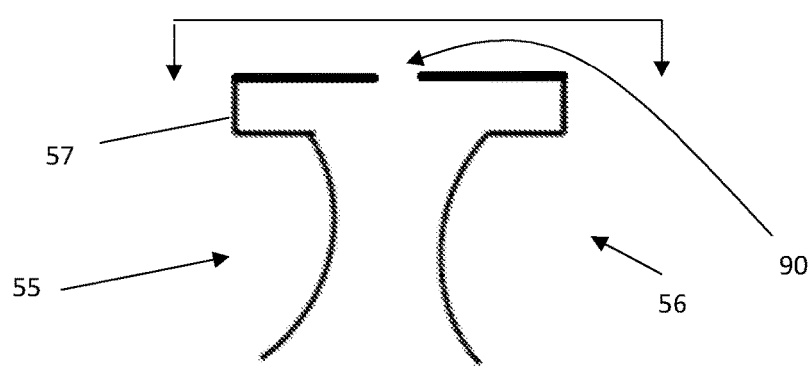
FIG. 14B is a cross-sectional view of a duct including a bulge.

FIG. 14B is a cross-sectional view of a duct 56. The duct 56 includes a venturi 55 with a bulge 57 at a top of the duct 56. The duct 56 includes an opening 90 that has a cross-sectional length that is smaller than a cross sectional length of the venturi 55.

Figure 15A:
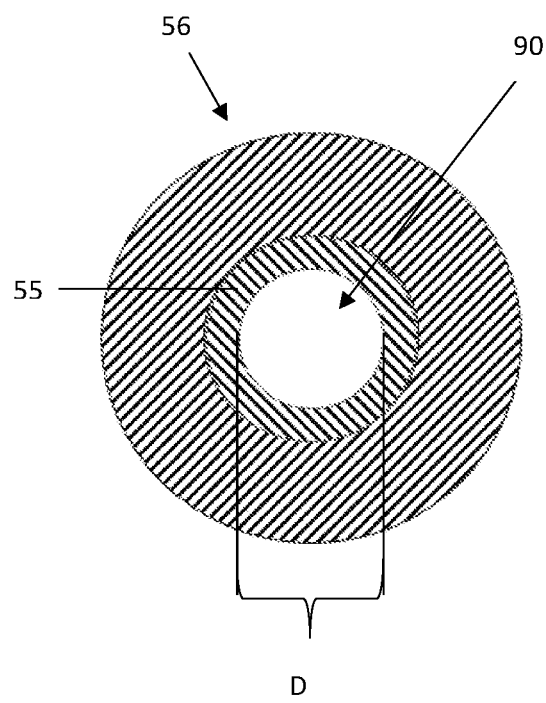
FIG. 15A is a top view of FIG. 14A when viewed along line XVA-XVA.

FIG. 15A is a top view of the duct 56 of FIG. 14A along lines XVA-XVA. The duct 56 includes an opening 90 with a distance (D). The distance (D) is the venturi 55 size and creates a restriction in fluid entering or exiting the plenum (not shown).

Figure 15B:
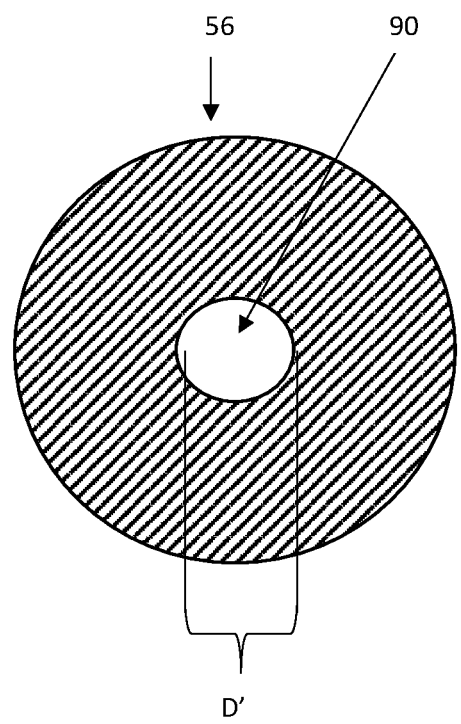
FIG. 15B is a top view of FIG. 14B when viewed along line XVB-XVB.

FIG. 15B is a top view of the duct 56 of FIG. 14B along lines XVB-XVB. The duct 56 includes an opening 90 with a distance (D') that is sized to permit a desired amount of fluid therethrough.

Any numerical values recited herein include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner.

Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

The disclosures of all articles and references, including patent applications and publications, are incorporated by reference for all purposes. The term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist essentially of or consist of the elements, ingredients, components or steps.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

It is understood that the above description is intended to be illustrative and not restrictive. Many embodiments as well as many applications besides the examples provided will be apparent to those of skill in the art upon reading the above description. The scope of the teaching should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventors did not consider such subject matter to be part of the disclosed inventive subject matter.

2 Conditioning System
20 Cushion
22 Support
24 Rear
26 Cushion Holes
28 Seat Suspension
30 Wire Frame
32 Plate Frame
34 Cushion Cavity
48 Distribution System
50 Plenum
52 Connection (e.g., seam around periphery)
54 Ventilation Holes
55 Venturi
56 Duct
57 Bulge
58 Open Space
60 Connection Recess
62 Baffles
64 Plenum Clip
70 Top Layer
72 Connection Layer
74 Bottom Layer
80 Blower
81 Blower Connection Feature
82 Housing
83 Blower Attachment Mechanism
84 Clip
86 Contour
88 Connection Features
89 Attachment Holes
90 Inlet
92 Tabs
94 Outlet

We claim:

1. A distribution system comprising:
   a plenum including:
      a top layer;
      a bottom layer;
      an open space formed between the top layer and the bottom layer;
      a blower connection feature located in the bottom layer for connecting a blower to the bottom layer of the plenum;
      a plurality of ventilation holes within the top layer; and
      a duct extending from one or more of the plurality of ventilation holes that couples the plenum to a cushion hole within a cushion so that the plenum and the cushion are in fluid communication; and
      wherein the plenum comprises one or more baffles located in the open space, which radiate away from the blower connection feature and direct fluid from the blower to the one or more of the plurality of ventilation holes, the one or more baffles are fixed from moving relative to the plenum.

2. The distribution system of claim 1, wherein the plenum includes one or more plenum clips that connect the plenum to a seat suspension.

3. The distribution system of claim 2, wherein the seat suspension includes one or more wire frames and the one or more plenum clips connect the plenum to at least one of the one or more wire frames.

4. The distribution system of claim 2, wherein the one or more plenum clips are molded with the plenum, connected to the plenum by a pressure sensitive adhesive, over molded into the plenum, or a combination thereof.

5. The distribution system of claim 1, wherein the top layer and the bottom layer are integrally formed so that the top layer and the bottom layer are one piece.

6. The distribution system of claim 1, wherein the top layer is connected to the bottom layer by welding, adhesive, ultrasonic welding, or a combination thereof.

7. The distribution system of claim 1, wherein the open space is free of any spacer material.

8. The distribution system of claim 1, wherein the plenum is connected to the cushion without tape, without hook and loop fasteners, without an adhesive, without a pressure sensitive adhesive, or a combination thereof.

9. The distribution system of claim 1, wherein the duct includes a diameter that is greater than a diameter of the cushion hole.

10. The distribution system of claim 1, wherein the duct includes a flared top.

11. The distribution system of claim 1, wherein a cross-sectional shape of the duct is conical, cylindrical, parabolic, or any combination thereof.

12. The distribution system of claim 1, wherein the one or more baffles are curved, teardrop shaped, crescent shaped, serpentine shaped, have a curved portion, or a combination thereof.

13. The distribution system of claim 1, wherein the duct extends into the cushion hole.

14. The distribution system of claim 1, wherein the one or more baffles are a plurality of baffles that radiate around the blower connection feature.

15. The distribution system of claim 1, wherein the one or more baffles direct air flow from the blower to the one or more of the plurality of ventilation holes to create a path between the blower and the plurality of ventilation holes to distribute substantially a same volume of air amongst the plurality of ventilation holes.

16. The distribution system of claim 1, wherein the one or more baffles curve around the blower connection feature.

17. The distribution system according to claim 1, wherein the one or more baffles each have a rib-like structure.

18. The distribution system according to claim 1, wherein the one or more baffles extend from the bottom layer towards the top layer of the plenum.

19. The distribution system according to claim 1, wherein the one or more baffles have a height that is less than a distance between the top layer and the bottom layer of the plenum.

20. A distribution system comprising:
   a plenum including:
      a top layer;
      a bottom layer;
      an open space formed between the top layer and the bottom layer;
      a blower connection feature located in the bottom layer for connecting a blower to the bottom layer of the plenum;
      a plurality of ventilation holes within the top layer; and
      a duct extending from one or more of the plurality of ventilation holes that couples the plenum to a cushion hole within a cushion so that the plenum and the cushion are in fluid communication; and
   wherein the plenum comprises one or more baffles located in the open space, which radiate away from the blower connection feature and direct fluid from the blower to the one or more of the plurality of ventilation holes, and wherein the plenum includes one or more contours so that a shape of the plenum substantially mirrors a rear side of the cushion.

21. The distribution system of claim 20, wherein the plenum includes one or more plenum clips that connect the plenum to a seat suspension.

22. The distribution system of claim 20, wherein the top layer and the bottom layer are integrally formed so that the top layer and the bottom layer are one piece.

23. The distribution system of claim 20, wherein the plenum is connected to the cushion without tape, without hook and loop fasteners, without an adhesive, without a pressure sensitive adhesive, or a combination thereof.

24. A method comprising:
   connecting a plenum to a seat suspension, the plenum comprising a top layer, an opposing bottom layer, and an open space defined therebetween; and
   connecting a blower to the plenum, the seat suspension, or both; and
   wherein the plenum is connected to the seat suspension by connecting a plurality of plenum clips to a wire frame of the seat suspension; and
   wherein the plenum comprises a ventilation hole and a duct, the duct extends from the ventilation hole to a cushion hole within a cushion, and
   wherein the plenum comprises one or more baffles located in the open space, which radiate away from the blower and direct fluid from the blower to the ventilation hole, the one or more baffles are fixed from moving relative to the plenum.

25. The method of claim 24, wherein the method includes a step of inserting the duct into the cushion hole to form a fluid connection.

26. The method of claim 24, wherein the one or more baffles are curved, teardrop shaped, crescent shaped, serpentine shaped, have a curved portion, or a combination thereof.

* * * * *